US011456551B2

(12) United States Patent
Brennan et al.

(10) Patent No.: US 11,456,551 B2
(45) Date of Patent: Sep. 27, 2022

(54) SPRING PIN CONNECTOR FOR BLIND-MATE COUPLING A SENSOR TO AN ELECTRONICS ASSEMBLY

(71) Applicant: Raytheon Company, Waltham, MA (US)

(72) Inventors: Matthew C. Brennan, Middletown, RI (US); Adam Maziarz, Riverside, RI (US); Daniel J. Duggan, II, Rochester, MA (US); Brian M. White, Bristol, RI (US)

(73) Assignee: Raytheon Company, Waltham, MA (US)

( * ) Notice: Subject to any disclaimer, the term of this patent is extended or adjusted under 35 U.S.C. 154(b) by 784 days.

(21) Appl. No.: 16/427,125

(22) Filed: May 30, 2019

(65) Prior Publication Data

US 2020/0381858 A1 Dec. 3, 2020

(51) Int. Cl.
*H01R 13/24* (2006.01)
*G01S 15/88* (2006.01)
*H01R 12/70* (2011.01)
*H01R 13/15* (2006.01)
*H01R 12/91* (2011.01)

(52) U.S. Cl.
CPC .......... *H01R 13/2421* (2013.01); *G01S 15/88* (2013.01); *H01R 12/70* (2013.01); *H01R 12/91* (2013.01); *H01R 13/15* (2013.01)

(58) Field of Classification Search
CPC .... H01R 13/2421; H01R 12/70; H01R 13/15; H01R 12/91; H01R 12/712; H01R 12/75; H01R 13/17; H01R 13/6315; H01R 13/2428; H01R 11/18; G01S 15/88
See application file for complete search history.

(56) References Cited

U.S. PATENT DOCUMENTS

2004/0137797 A1\* 7/2004 Caines ............... H01R 13/2407
439/660
2015/0147911 A1 5/2015 Logan, Jr. et al.

FOREIGN PATENT DOCUMENTS

| EP | 3067992 A1 | 9/2016 | |
| EP | 3076489 A1 \* | 10/2016 | ............. H01R 12/55 |
| EP | 3184982 B1 \* | 3/2020 | ............. G01L 19/00 |

OTHER PUBLICATIONS

Invitation to Pay Additional Fees for International Application No. PCT/US2020/025765 dated Jul. 17, 2020, 13 pages.

\* cited by examiner

*Primary Examiner* — Travis S Chambers

(57) ABSTRACT

A sensor assembly comprises an electronics assembly having a circuit board, a sensor mount structure comprising a first side and a second side, and an aperture formed from the first side towards the second side. The sensor assembly can comprise a sensor supported by the sensor mount structure, such that the sensor is situated, at least partially, in the aperture. The sensor assembly can comprise a spring pin connector coupled to the sensor mount structure, and having a connector body and a pair of conductive spring pins supported by the connector body and electrically coupled to the sensor, and blind-mate interfaced to the circuit board of the electronics assembly, thereby electrically coupling the sensor to the electronics assembly. A sensor array module can include a plurality of sensors and spring pin connectors coupled to a sensor mount structure, which can provide a transponder array of a torpedo.

26 Claims, 16 Drawing Sheets

SPRING PIN CONNECTOR FOR BLIND-MATE COUPLING A SENSOR TO AN ELECTRONICS ASSEMBLY

BACKGROUND

Sonar sensors or transponders are typically mounted in an array to a structure about a front area or nose of a torpedo for sensing acoustic waves in an underwater environment to assist with operation of the torpedo (i.e., for propulsion, navigation, tracking). Such sensors are typically mounted to holes of a plate, and then electrically coupled to a sonar electronics assembly for transferring sensor data generated by the sensors to the sonar electronics assembly for processing. Thus, each sensor must be manually wired to an interface board from an inner side of the plate, and then sockets of the interface board must be interfaced to pins of the sonar electronics assembly to make appropriate electromechanical contact.

This pin/socket interface requires high/tight tolerances of the socket and pin connections between the interface board and the sonar electronics assembly, which is prone to damage if not properly aligned during such electromechanical coupling. Any resulting damage to the pin/socket connections can cause improper function of one or more sensors, and can cause expensive delays during testing of the sonar electronics assembly. Moreover, individually and manually wiring hundreds of sonar sensors to an interface board is time consuming and costly, and can result in accidental reverse polarity of the lead wires due to human error during installation.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
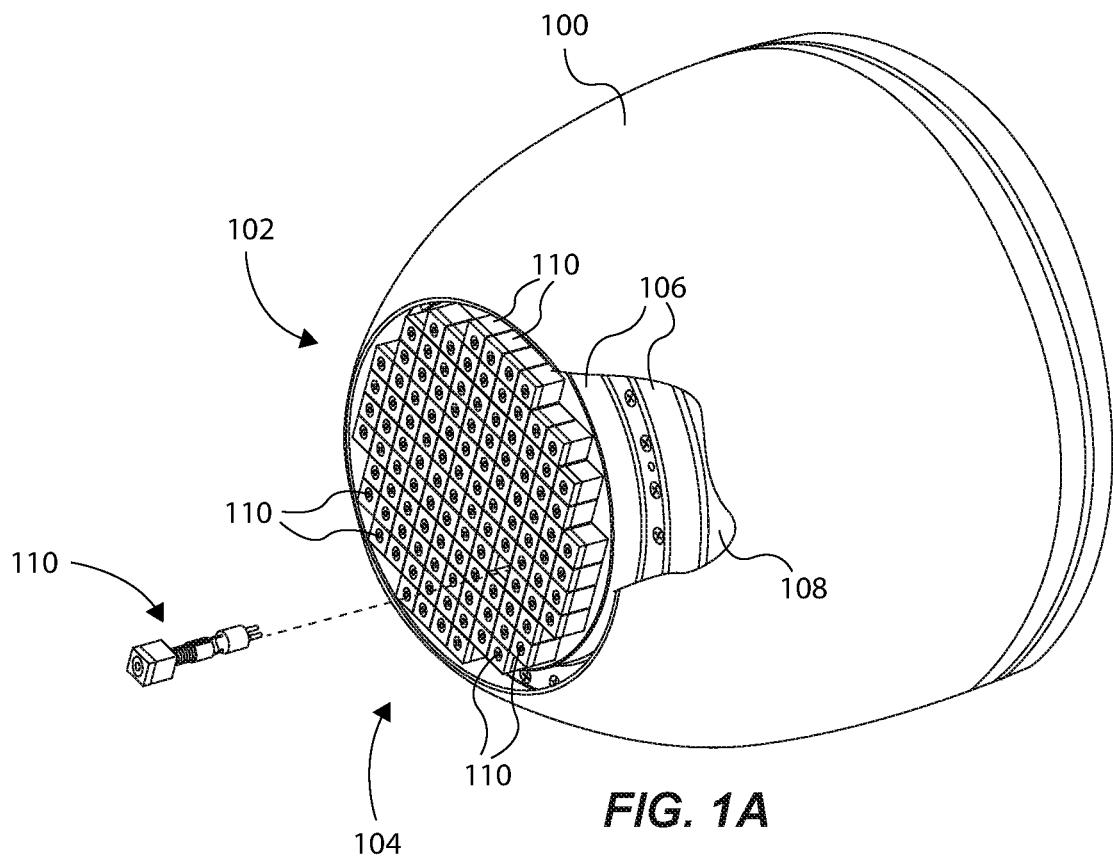
FIG. 1A is an isometric view of a sensor assembly of a vehicle, in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The present disclosure sets forth a sensor assembly comprising an electronics assembly having a circuit board; a sensor mount structure comprising a first side and a second side, and an aperture formed from the first side towards the second side; a sensor supported by the sensor mount structure, such that the sensor is situated, at least partially, in the aperture of the sensor mount structure; and a spring pin connector coupled to the sensor mount structure, the spring pin connector having a connector body and a pair of conductive spring pins supported by and extending through the connector body, the pair of conductive spring pins electrically coupled to the sensor, and blind-mate interfaced to the circuit board of the electronics assembly, thereby electrically coupling the sensor to the electronics assembly.

The present disclosure also sets forth a spring pin connector for electrically coupling a sensor to an electronics assembly, comprising a connector body having a coupling interface operable to couple the connector body to a sensor mount structure; a pair of pin holes formed through the connector body; a pair of conductive spring pins extending through respective pin holes and supported by the connector body. Each of the conductive spring pins comprises a wiring portion that extends from a first side of the connector body, the wiring portion being configured to be electrically coupled to a sensor supported by the sensor mount structure; a contact portion that extends from a second side of the connector body opposite the first side; and a spring operably coupled between the wiring portion and the contact portion, such that the contact portion is axially movable relative to the wiring portion. In response to interfacing the contact portions of the conductive spring pins to a circuit board of an electronics assembly, the contact portions translate relative to the wiring portions via compression of respective springs to blind-mate couple the spring pin connector to the circuit board to electrically couple the sensor to the electronics assembly.

The present disclosure further sets forth a method for configuring a sensor assembly, the method comprising obtaining a sensor mount structure having a plurality of apertures formed from a first side toward a second side of the sensor mount structure; and attaching a plurality of spring pin connectors to the sensor mount structure; each spring pin connector associated with a respective aperture of the sensor mount structure, and having a pair of conductive spring pins electrically coupled to a sensor situated at least partially in a respective aperture of the sensor mount structure, to form a sensor array module configured to be blind-mate coupled to an electronics assembly. The method cam further comprise blind-mate coupling the conductive spring pins of each spring pin connector to a circuit board of an electronics assembly to electrically couple the plurality of sensors to the electronics assembly.

To further describe the present technology, examples are now provided with reference to the figures. FIG. 1A illustrates a body section 100 supporting a sensor assembly 102 comprising a sensor array module 104, in accordance with an example of the present disclosure. The sensor array module 104 can comprise a sensor mount structure 106 attached to a chassis 108 of the body section 100 (or attached to a structure or frame or chassis of a vehicle including the body section 100, for instance). The sensor array module 104 can further comprise a plurality of sensors 110 arranged in a sensor array and supported by the sensor mount structure 106. The sensor array module 104 can further comprise a plurality of spring pin connectors 112 (see e.g., FIGS. 1B-2B) supported by the sensor mount structure 106. See also FIG. 5A for an example of a sensor array module, showing an array of sensors and a plurality of spring pin connectors supported by a sensor mount structure.

Figure 1B:
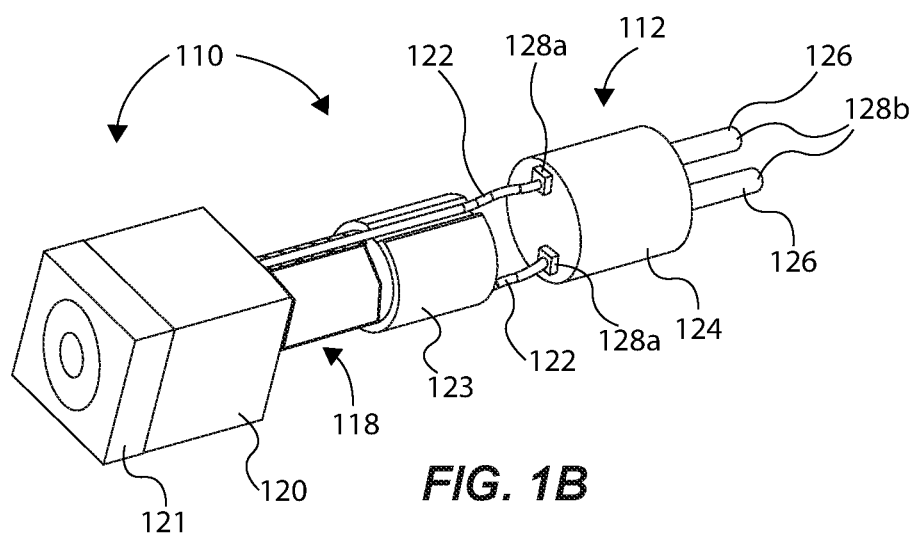
FIG. 1B is close up view of one sensor and one spring pin connector of the sensor assembly of FIG. 1A.
Figure 1C:
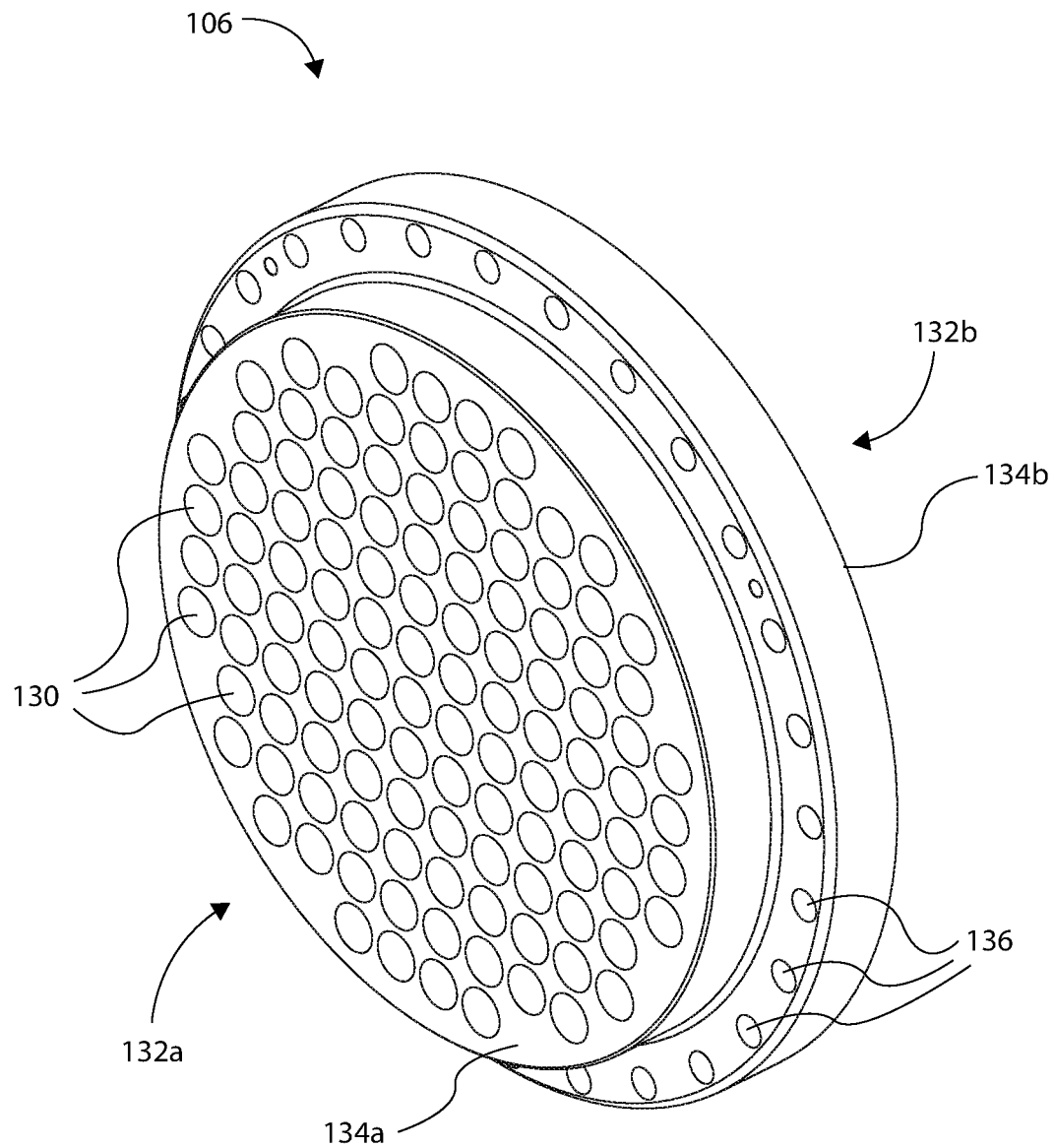
FIG. 1O is an isometric view of a sensor mount structure of the sensor assembly of FIG. 1A.
Figure 2A:
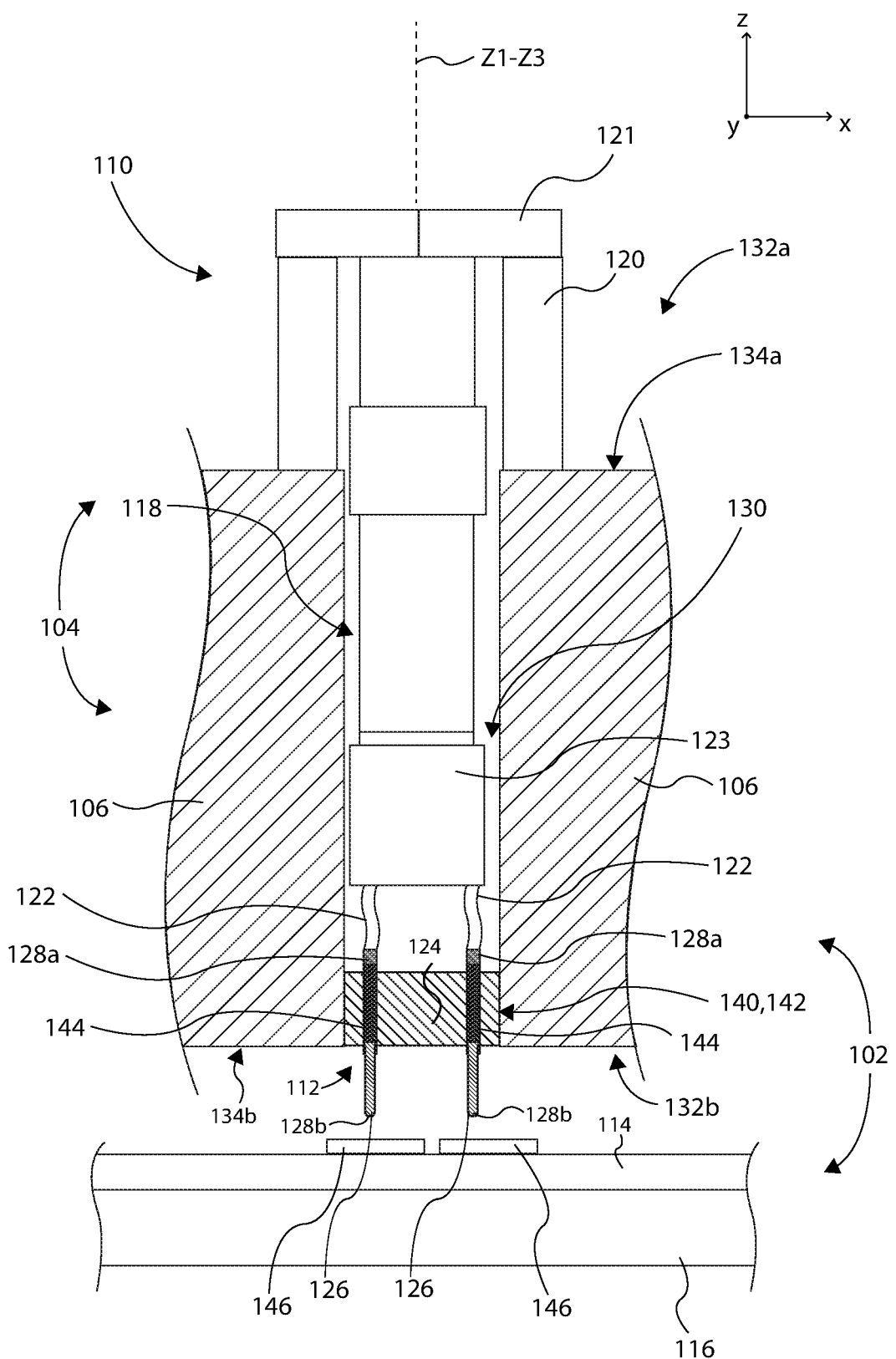
FIG. 2A is a side schematic view of a section of the sensor assembly of FIG. 1A mounted to a chassis, and in an uncoupled position from a circuit board of an electronics assembly.
Figure 2B:
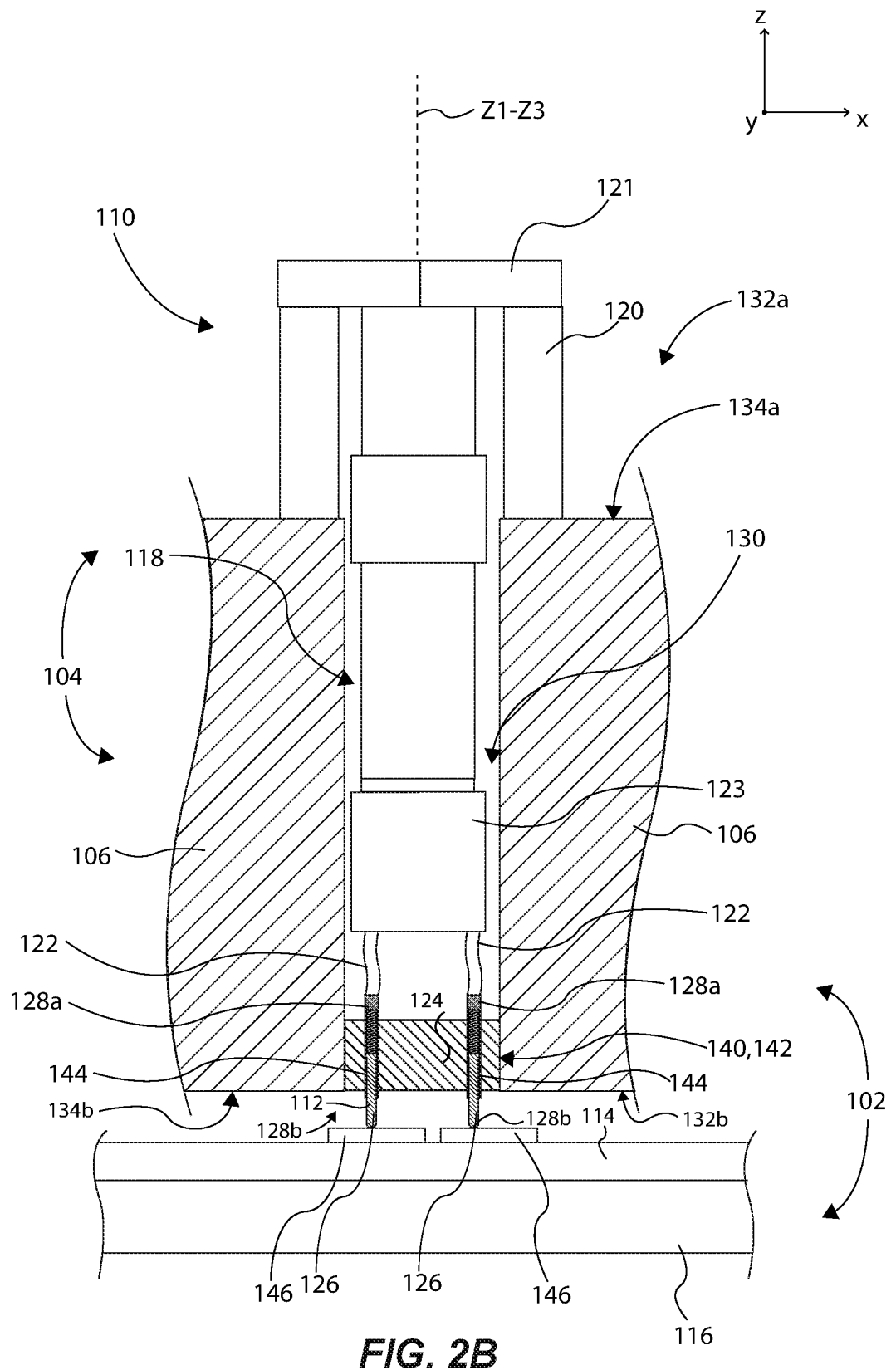
FIG. 2B shows the section of the sensor mount assembly of FIG. 2A, and in a blind-mate interfaced or coupled position with the circuit board of the electronics assembly.

As an overview, and with additional reference to FIGS. 2A and 2B, the plurality of spring pin connectors 112 (the figures showing one spring pin connector 112) can be blind-mate interfaced or coupled to a circuit board 114 of an electronics assembly 116 of the sensor assembly 102. That is, each spring pin connector 112 is operable to electrically couple a corresponding sensor 110 to the electronics assembly 116, as further discussed in the generic example of FIGS. 1B-2B, and more specific examples of FIGS. 3A-6B.

In one example, the body section 100 and the sensor assembly 102 can be component s of a vehicle, such as an underwater ordinance type of vehicle (e.g., a torpedo), or a remote operated vehicle (ROV), or any other unmanned vehicle such, as those operable underwater, in air or in space (e.g., ship, airplane, rocket, and others). Alternatively, the vehicle can be a type of manned vehicle, whether operable underwater, in air, or in space. Alternatively, the sensor assembly 104 can be supported by a structure such as a building, tower, etc., or even on a vessel. In still another example, a mobile device or other assembly can comprise one or more sensors or speakers or transponders mounted to a structure (e.g., 106) and blind-mate coupled to an electronics assembly using a spring connector as taught herein (e.g., spring connector 112, and/or others exemplified herein).

In one example the present disclosure provides a sensor assembly (e.g., sensor assembly 104) supported by any suitable vehicle having at least one, or operable to carry out, at least one sensing function. The body section 100 in the example shown comprises a nose section of a torpedo (e.g., a Mark 48 type of torpedo) having an array of sonar sensors 110 (e.g., transponders) situated about a forward or nose area of the torpedo for sensing underwater acoustic waves, which is typically for purposes of underwater location marking, position tracking, and navigation of the torpedo.

Shown generically in FIG. 1B, the sensor 110 can be a known or traditional type, such as a transponder sonar sensor assembly, so its structure and function will not be discussed in great detail. However, the sensor 110 can comprise one or more sensing element(s) 118 (e.g., stack of piezoelectric elements), a mass 120, a transponder component 121, and a piston body 123. Lead wires 122 can be coupled to the sensing element(s) 118 and to the spring pin connector 112, as further detailed below. As well known, it desirable to support a sonar sensor in a manner that allows some amount of free movement or reaction of the sensing element(s) 118 (and the piston body 123), so that sound waves impinging on the sensing element(s) can appropriately be sensed by the sensor (and be transmitted from the sensor, in a traditional manner of a transponder). Thus, as further detailed below, the sensor 110 is not rigidly constrained to the spring pin connector 112, so that the sensing element(s) 118 can react appropriately in response to sound waves impinging on the sensor 110.

More particularly, the spring pin connector 112 can comprise a connector body 124 and a pair of conductive spring pins 126 supported by and extending through the connector body 124. As further exemplified below, each conductive spring pin 126 can comprise a wiring portion 128a (FIG. 2A) for coupling to the lead wires 122 of the sensor 110, and can comprise a contact portion 128b for interfacing with the circuit board 114. In this way, electrical signals can be transferred between the sensor 110, and through the lead wires 122, and through conductive spring pins 126 to the electronics assembly 116, as shown in FIG. 2B and further discussed below. Note that the electronics assembly 116 can be part of sonar electronics, such as a circuit card assembly having processors(s), memory device(s), storage device(s), and other known electronics for receiving and processing sensor output data, and, in one example, for operating transponder arrays of a torpedo.

With reference to FIG. 1C, the sensor mount structure 106 can comprise a cylindrically shaped plate or disk, and can include a plurality of apertures 130 that receive and support at least a portion of each respective sensor 110 (FIG. 2A). The sensor mount structure 106 can comprise a first side 132a and a second side 132b, and the first side 132a can include a first surface 134a and the second side 132b can include a second surface 134b (which can be planar surfaces). The sensor mount structure 106 can comprise a plurality of mount holes 136 formed circumferentially around the perimeter of the sensor mount structure 106 for receiving fasteners to attach the sensor mount structure 106 to the chassis 108, for instance, as illustrated in the assembled configuration of FIG. 1A.

As introduced above, FIGS. 2A and 2B illustrate a side schematic view of a section of the sensor assembly 104, including the sensor 110, the spring pin connector 112, the sensor mount structure 106, and the electronics assembly 116 (having the circuit board 114). As shown in FIG. 2A, the spring pin connector 112 is uncoupled or disconnected from the circuit board 114 of the electronics assembly 116, and FIG. 2B shows the spring pin connector 112 blind-mate interfaced or coupled to the circuit board 114.

More specifically, the transponder component 121 and the mass 120 of the sensor 110 are situated about the first side 132a of the sensor mount structure 106, and the mass 120 can be coupled to the first planar surface 134a of the sensor mount structure 106. In this manner, the sensor elements 118 and the piston body 123 are situated in the aperture 130 of the sensor mount structure 106. Note that the mass 120 can comprise a noise isolation block, or mounting block, that is attached/bonded directly to the first planar surface 134a of the sensor mount structure 106, so that the sensing elements 118 (e.g., piezoelectric stack) and the piston body 123 can "float" relative to the mass 120 in response to activating the sensing elements 118 transmitting sound waves) and in response to receiving or sensing sounds waves to generate sensor data by the sensing elements 118, in a traditional manner of a transponder sensor. Note that the sensing elements 118 can be one or more other sensing elements, such as a geophone, hydrophone, microphone, seismometer, sound locator, or other such acoustic/sound/vibration sensor. Alternatively, the sensor 110 can be replaced with another sensor, or can have other (non-acoustic) sensing element(s) that are supported by a particular sensor mount structure.

Figure 3A:
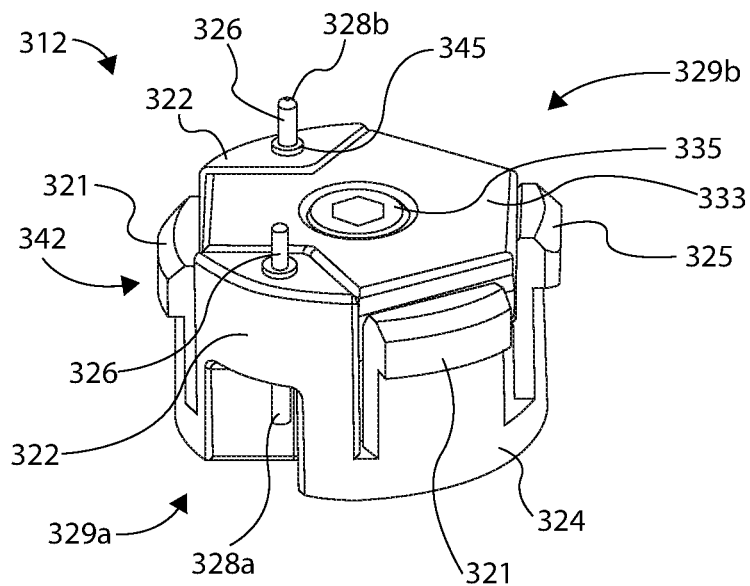
FIG. 3A is an isometric view of a spring pin connector, in accordance with an example of the present disclosure.
Figure 3B:
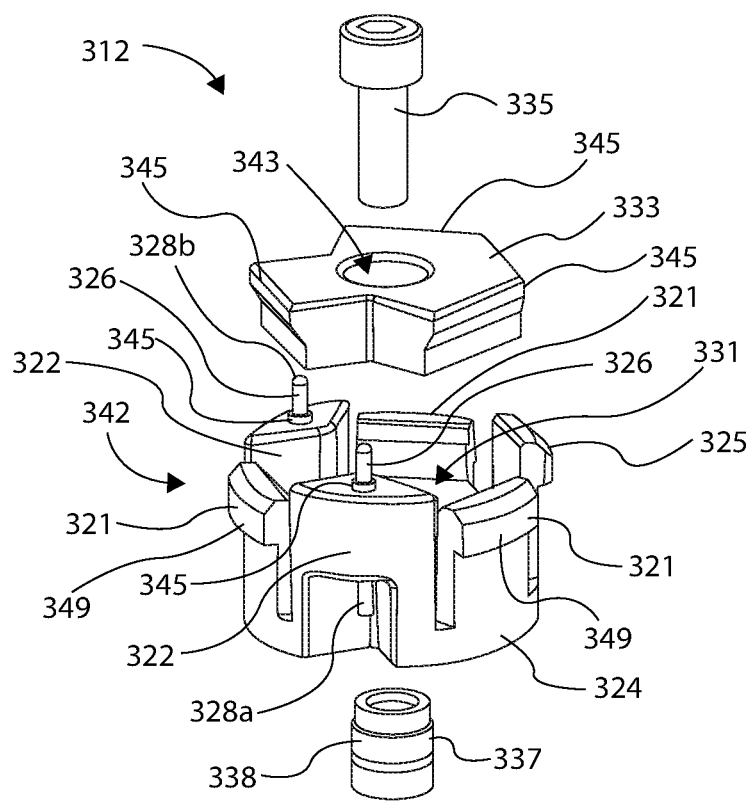
FIG. 3B is an isometric exploded view of the spring pin connector of FIG. 3A.
Figure 3C:
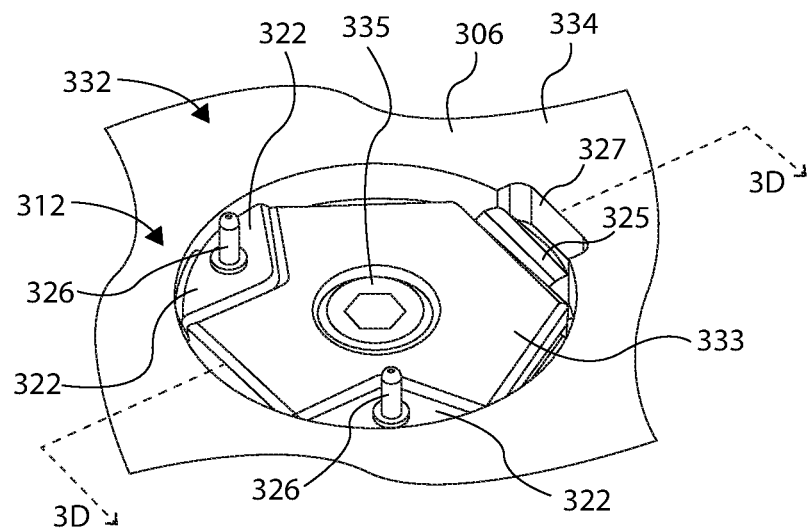
FIG. 3C is an isometric view of the spring pin connector of FIG. 3A installed or attached to a sensor mount structure, in accordance with an example of the present disclosure.
Figure 3D:
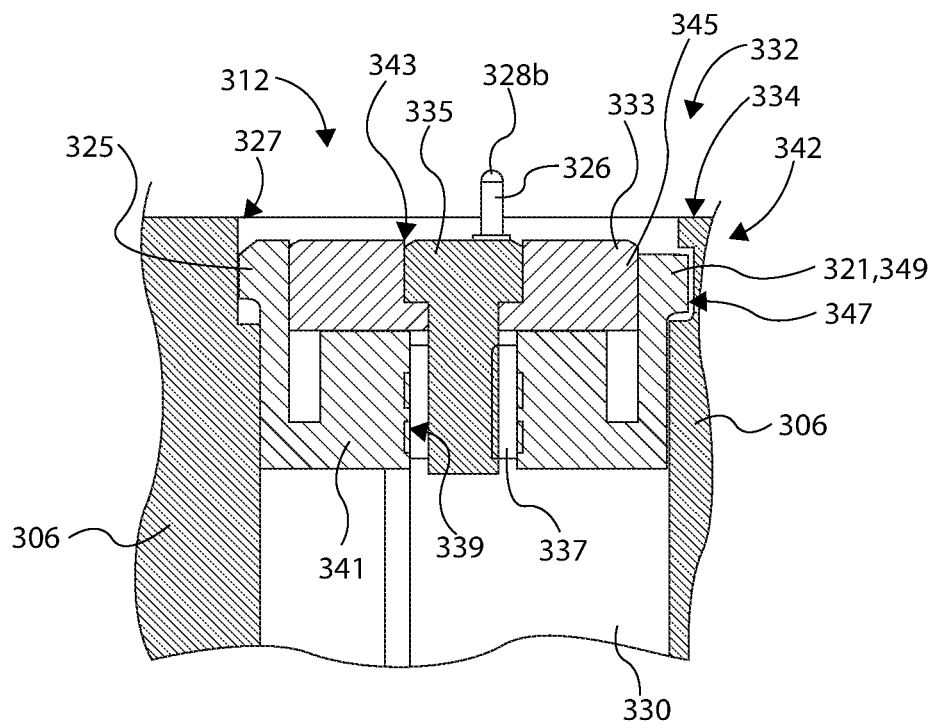
FIG. 3D is a cross sectional view of the spring pin connector of FIG. 3A, and taken along lines 3D-3D of FIG. 3D.
Figure 4A:
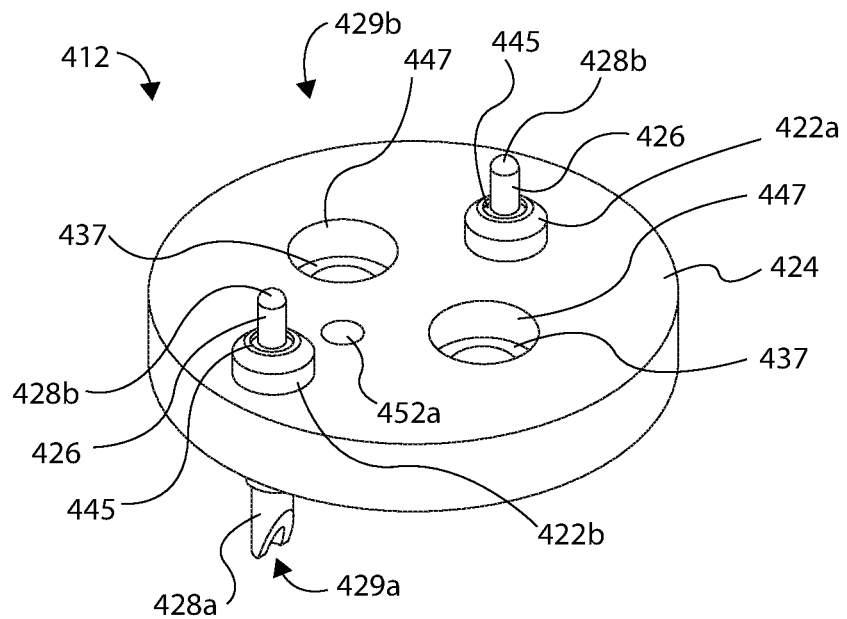
FIG. 4A is an isometric view of a spring pin connector, in accordance with an example of the present disclosure.
Figure 4B:
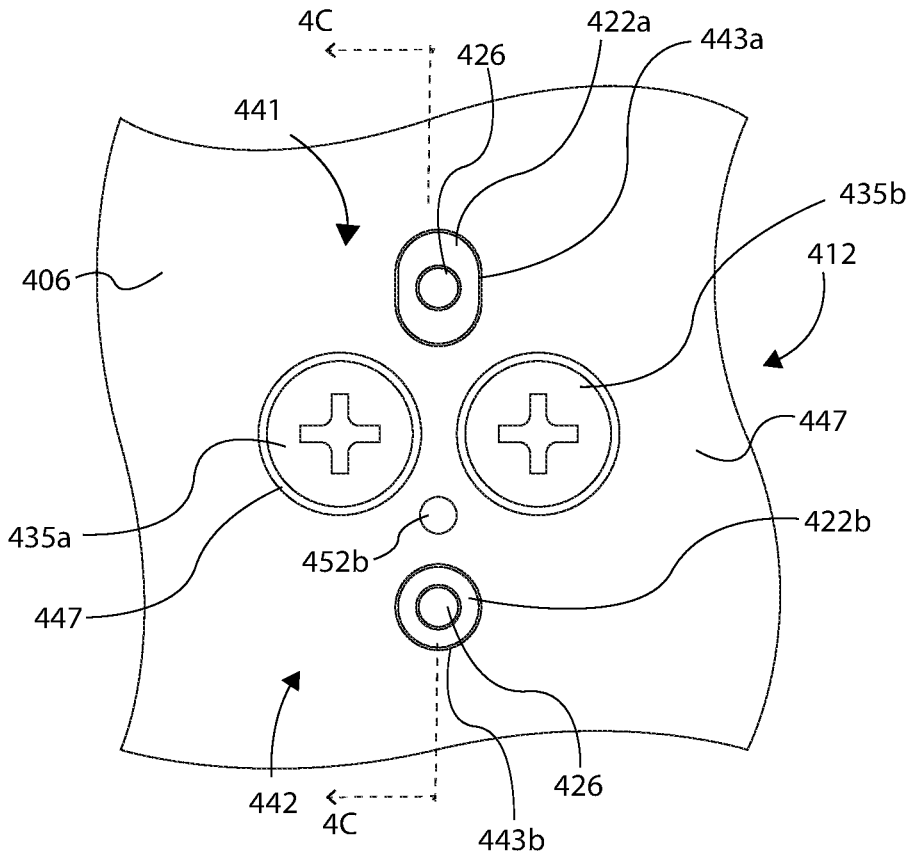
FIG. 4B is top down view of the spring pin connector of FIG. 4A installed or attached to a sensor mount structure, in accordance with an example of the present disclosure.
Figure 4C:
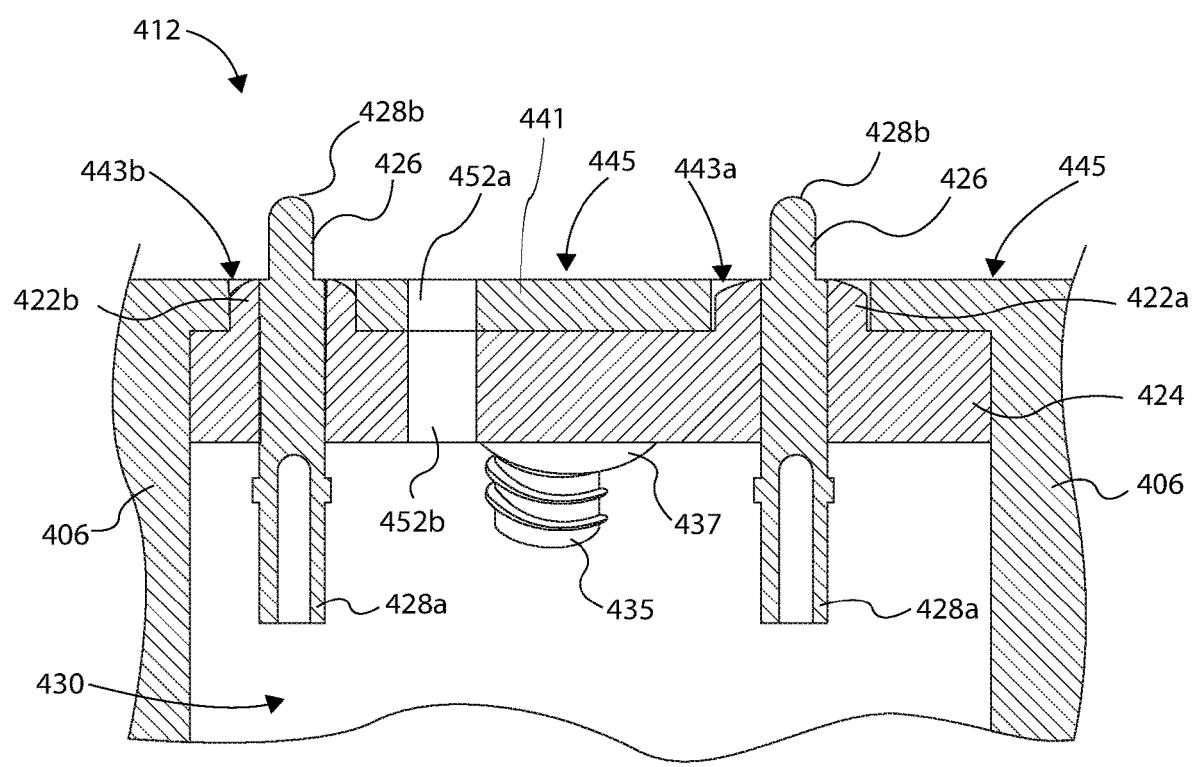
FIG. 4C is a cross sectional view of the spring pin connector of FIG. 4A, and taken along lines 4C-4C of FIG. 4B.
Figure 4D:
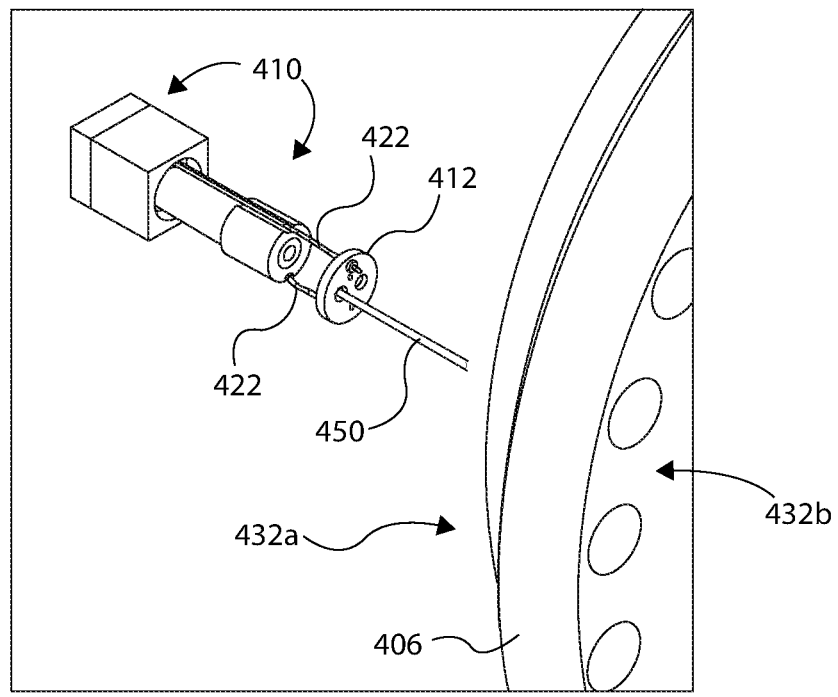
FIG. 4D is an isometric view of the spring pin connector of FIG. 4A and a sensor ready to be installed to the sensor mount structure, in accordance with an example of the present disclosure.
Figure 4E:
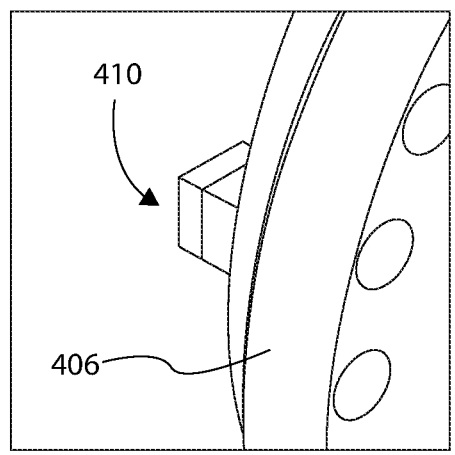
FIG. 4E is an isometric view of the spring pin connector of FIG. 4A and the sensor partially coupled to the sensor mount structure.
Figure 4F:
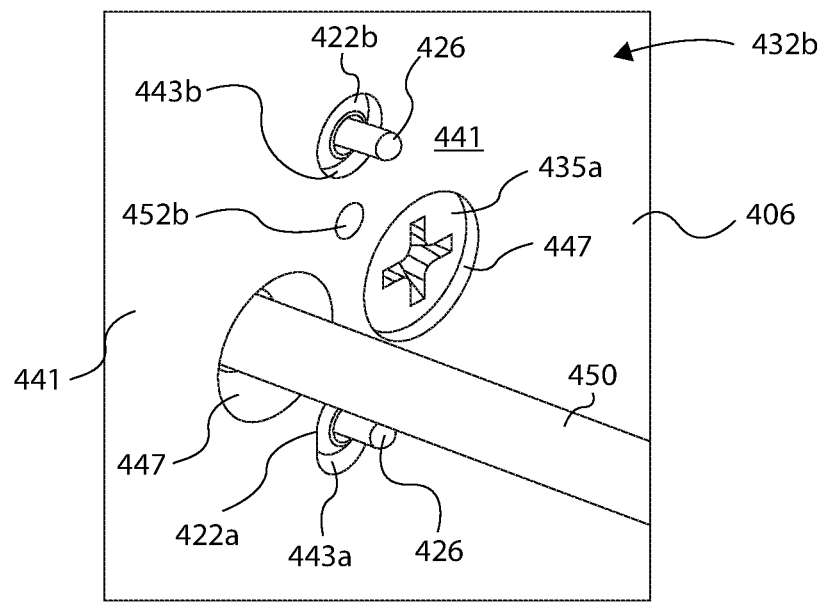
FIG. 4F is an isometric (close up) view of the spring pin connector of FIG. 4A partially coupled to the sensor mount structure.
Figure 4G:
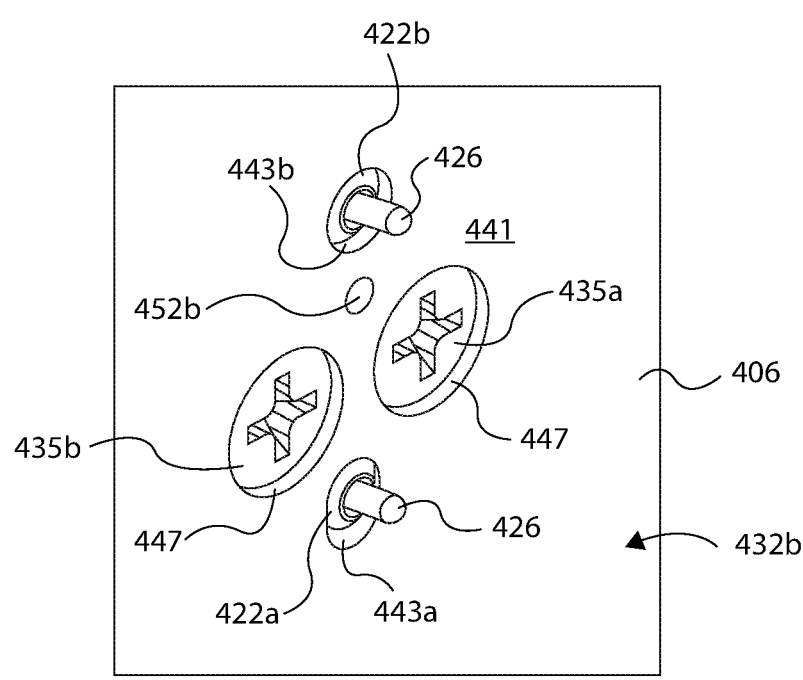
FIG. 4G is an isometric (close up) view of the spring pin connector of FIG. 4A fully coupled to the sensor mount structure.
Figure 5A:
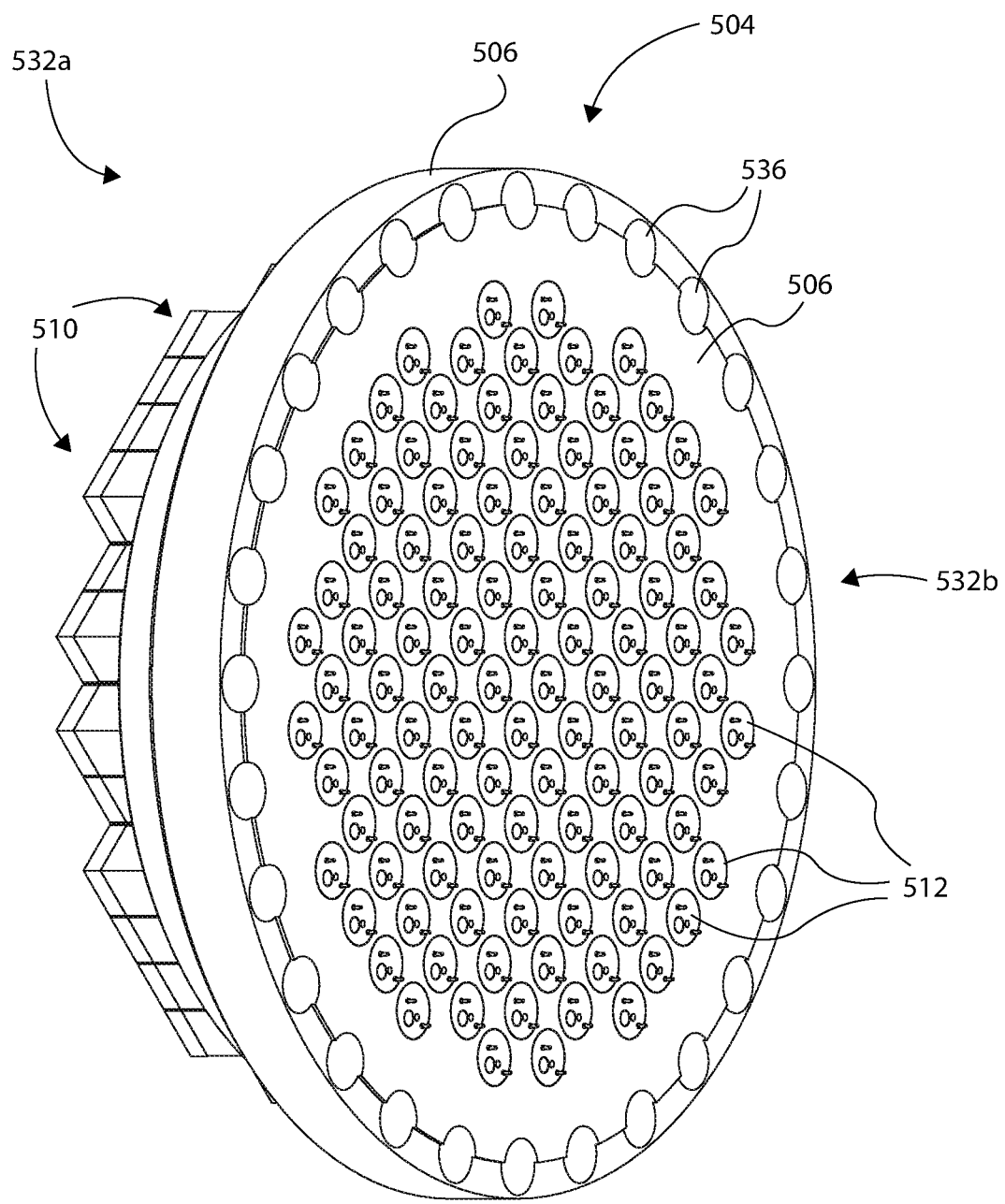
FIG. 5A is an isometric view of a sensor array module, in accordance with an example of the present disclosure.
Figure 5B:
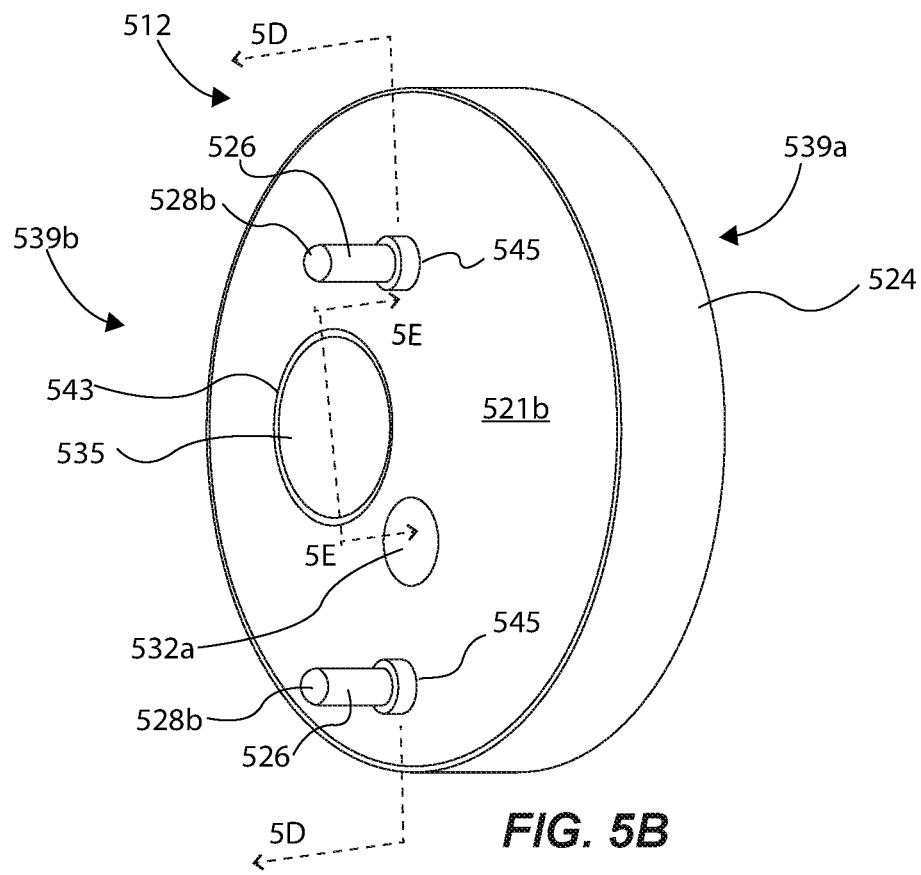
FIG. 5B is an isometric view of a spring pin connector of the sensor array module of FIG. 5A.
Figure 5C:
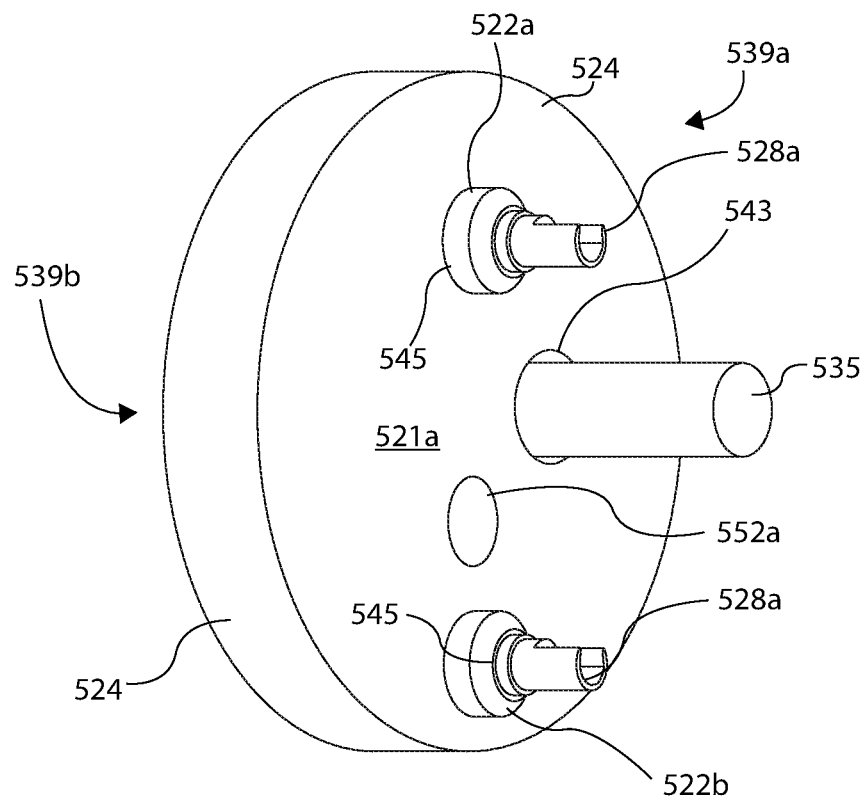
FIG. 5C is an isometric view of the spring pin connector of FIG. 5B from another side of the spring pin connector.
Figure 5D:
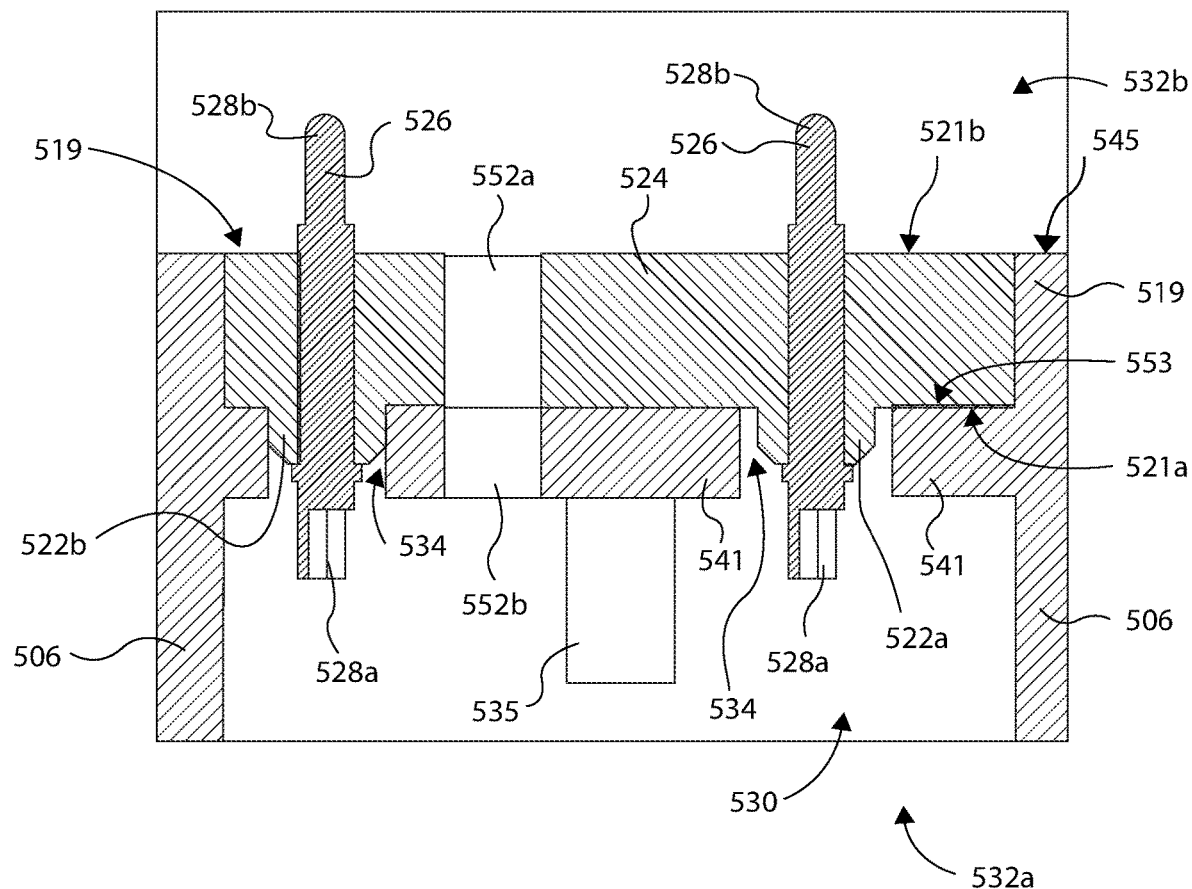
FIG. 5D is a cross sectional view of the spring pin connector of FIG. 5B, and taken along lines 5D-5D, and showing the spring pin connector coupled to the sensor mount structure of the sensor array module of FIG. 5A.
Figure 5E:
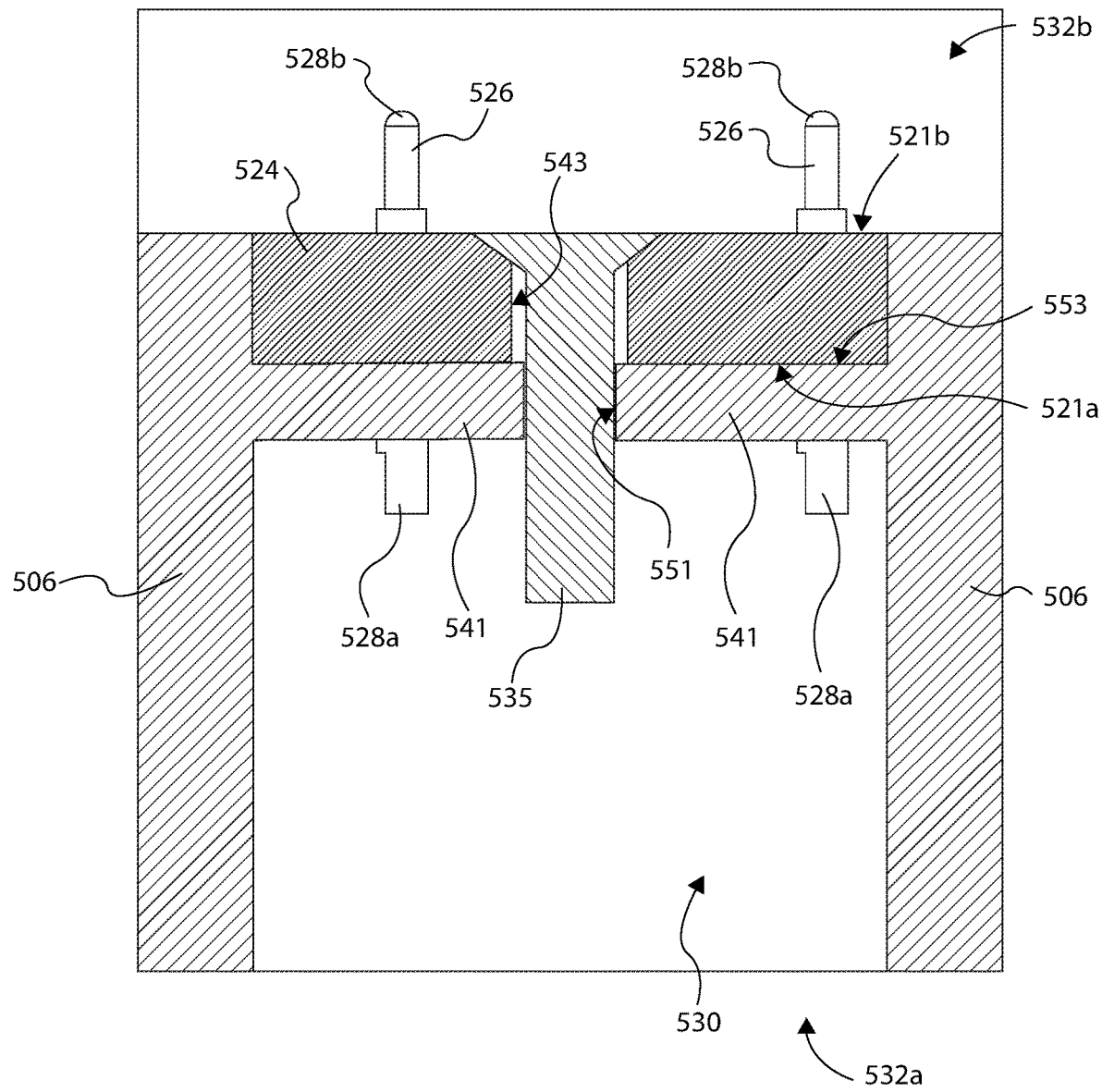
FIG. 5E is a cross sectional view of the spring pin connector of FIG. 5B, and taken along lines 5E-5E, and showing the spring pin connector coupled to the sensor mount structure of the sensor array module of FIG. 5A.

Note that the aperture 130 extends from the first side 132a toward the second side 132b of the sensor mount structure 106, and can extend all the way through the sensor mount structure 106, or partially through a sensor mount structure (see e.g., FIGS. 4C and 5D). The spring pin connector 112 can be coupled or attached to a connector mount portion 140 of the sensor mount structure 106 proximate the second side 132b. Thus, the connector body 124 can comprise a coupling interface 142 for attachment to the connector mount portion 140 of the sensor mount structure 106. This attachment interface between the spring pin connector 112 and the sensor mount structure 106 can comprise various configurations or designs operable and configured to facilitate fastening or coupling of the spring pin connector 112 to the sensor mount structure 106, such as further discussed below regarding the examples of FIGS. 3A-6B for securing a spring pin connector (e.g., see spring connectors 312, 412, 512, 612) to a sensor mount structure (e.g., see sensor mount structures 306, 406, 506, 606).

As noted above, the spring pin connector 112 can comprise the pair of conductive spring pins 126 supported by the connector body 124. As shown, the contact portions 128b extend from one side of the connector body 124 and toward the circuit board 114, and also extend beyond the second planar surface 134b of the second side 132b of the sensor mount structure 106. The wiring portions 128a of the conductive spring pins 126 extend from the other side of the connector body 124, and are at least partially situated in the aperture 130 of the sensor mount structure 106, and can be coupled to the lead wires 122 coupled to the sensor 110. Thus, the lead wires 122 are entirely contained or situated within the aperture 130, such that no portion of the lead wires 122 extend out from the aperture 130. This is beneficial over prior assemblies that require lead wires from the sensor to be coupled to interface boards outside of the aperture, for instance, because it can be quite time consuming and cumbersome to extend lead wires of hundreds of sensors through apertures of a sensor mount structure, and then solder them to an interface board. Thus, the present configuration of the lead wires being contained in the aperture can also reduce the length of wiring as compared to prior assemblies, which reduces costs, complexity, losses, impedance, noise, assembly time, etc.

The arrangement and configuration of the lead wires 122 "loosely" coupling together the spring pin connector 112 and the sensor 110 can define "a sensor float system" that facilitates axial float (i.e., limited movement) in two degrees of freedom of the sensing elements 118 and the piston body 123 relative to the spring pin connector 112. This is because the sensing elements 118 are not rigidly constrained to the spring pin connector 112, and thus the sensing elements 118 are isolated from the spring pin connector 112 and the sensor mount structure 106. This can reduce or minimize noise because the sensing elements 118 are isolated or suspended from the spring pin connector 112, so that the sensing elements 118 can appropriately operate for transmitting sound waves and sensing sound waves. If the spring pin connector 112 were rigidly constrained to the sensing elements 118 and/or the piston body 123, an amount of noise or rattling would exist in the system during sensing, which would negatively impact effective operation of the sensor 110.

As shown in FIG. 2A, each conductive spring 126 can further comprise a spring 144 (e.g., coil spring) operably coupled between the wiring portion 128a and the contact portion 128b. The contact portion 128b is configured to translate into the wiring portion 128a, as shown in FIG. 2B, via compression of the spring 144 upon a load applied to the contact portion 128b. Note that the wiring portion 128a can be press fit or otherwise fixed through a respective pin hole (see e.g., FIG. 4C) of the connector body 124, while the contact portion 128b can axially move relative to the wiring portion 128a. In this manner, the contact portions 128b of the conductive spring pins 126 can be independently movable with respect to each other while being blind-mate interfaced to the circuit board 114, which can account for positional tolerance variations that will typically exist between the sensor array module 102 and the electronics assembly 116. This is an example of a connector float system, as further discussed below.

More specifically, while the sensor mount structure 106 is being fastened/attached to the chassis 108, the spring pin connector 112 moves toward the circuit board 114 for blind-mate coupling the conductive spring pins 126 to respective contact pads 146 of the circuit board 114. That is, in response to the contact portions 128b contacting the respective contact pads 146, the springs 144 compress in response to axial translation of the contact portions 128b relative to the wiring portions 128a (and relative to the connector body 124). The spring 144, therefore, applies a biasing force to the respective contact portions 128b of the respective conductive spring pins 126 to maintain electromechanical connection between the contact portions 128b and the respective contact pads 146 (note that the contact pads 146 can be planar conductive pads, or slightly concave conductive pads). Thus, despite positional tolerance variations between the conductive spring pins 126 and the contact pads 146 in the z-axis, the construction and arrangement of the conductive spring pins 126 ensures proper electromechanical connection because the spring pins 126 deflect axially and independently relative to each other and relative to the connector body 124 axially along the z-axis, thereby providing two degrees of freedom of movement of each spring pin 126. This is one example of "a connector float system" associated with each connector 112 to facilitate float in at least one degree of freedom of each spring pin 126 relative to the circuit board 114. Thus, each spring pin 126 can float axially and bi-directionally along the z-axis relative to the circuit board 114.

In another example of a connector float system, the contact portions 128b of the spring pins 126 may have rounded tip ends, while the contact pads 146 may be generally planar (or slightly concave-shaped) and relatively large surface area relative to the tip ends of the contact portions 128b, so that the contact portions 128b can be slightly axially misaligned in the x and/or y axes (and/or radially misaligned in the x and/or y axes) relative to the respective contact pads 146 (due to assembly tolerance variations), but can still make effective electromechanical contact with the respective contact pad 146 because of the rounded tip of each spring pin interfacing to the respective planar contact pads 146. Thus, each spring pin 126 can float axially along both the x-axis and y-axis (i.e., two degrees of freedom of movement), and also can float radially about the x-axis and y-axis (i.e., two degrees of freedom of movement). In culmination, in one example the connector float system can facilitate up to five degrees of freedom of movement of the spring pins 126 relative to the circuit board 114. Compare this to the restrictive aspects of a socket/pin interface connection of traditional connectors that may not provide any such float, or that may only have axial float in one direction. Such traditional socket/pin interfaces mentioned above often result in damage or misconnection of the socket/pin interface coupled to each other due to positional tolerance variations that exists in a particular assembly. However, the contact float system(s) discussed in the present disclosure can reduce or eliminate the likelihood of such damage or misconnection due to misalignment resulting from tolerance variations, as can be appreciated from the discussions herein.

Accordingly, on a system level, when coupling dozens or hundreds of spring pin connectors 112 (e.g., see spring pin connectors 312, 412, 512, 612) to pads of the circuit board 114, a number of positional tolerance variations may exist between the numerous conductive spring pins and their receiving contact pads on the circuit board. However, because of the aforementioned connector float system, an installer can ensure that each conductive spring pin has made proper electromechanical connection to a respective pad without the likelihood of connector damage or misconnections while blind-mate coupling dozens or hundreds of such spring pin connectors 112, for instance.

Notably, the connector body 124 can be situated at least partially in the aperture 130 of the sensor mount structure 106, which provides an amount of structural rigidity to the spring pin connectors 112 as supported by the sensor mount structure 106. Further note that the spring pin connector 112 and the sensor 110 of FIG. 2B are aligned relative to each other as being situated (at least partially) in the aperture 130 and along the aperture 130. That is, the connector body 124 can comprise or define a central longitudinal axis Z1 that extends through a central area or portion of the connector body 124. Similarly, the sensor 110 can comprise a central longitudinal axis Z2 that extends centrally through components of the sensor 110. And, the aperture 130 of the sensor mount structure 106 can comprise a central longitudinal axis Z3 that extends centrally through the aperture 130, as shown. Accordingly, the axes Z1-Z3 are substantially collinear with each other, because the spring pin connector 112 is aligned with the sensor 110, and because both the spring pin connector 112 and the sensor 110 are supported (at least partially) in the (same) aperture 130 of the sensor mount structure 106.

The spring pin connector 112 is shown generically as being coupled to the sensor mount structure 106, and therefore any of the spring pin connector examples discussed herein can replace the spring pin connector 112, and can include all the same features discussed above, such as the central longitudinal axis Z1, and having a portion of the connector body 124 situated in the aperture 130, etc., as should be appreciated from the following examples.

FIGS. 3A-3D illustrate a spring pin connector 312 for electrically coupling a sensor (e.g., 110) to a circuit board (e.g., 114) of an electronics assembly (e.g., 116), in accordance with an example of the present disclosure. Similarly as exemplified above regarding FIGS. 2A and 2B, the spring pin connector 312 is configured to be attached to a sensor mount structure 306 (see FIG. 3D) to be blind-mate coupled to the circuit board for electrically coupling the sensor to the electronics assembly.

More specifically, the spring pin connector 312 can comprise a connector body 324 having a coupling interface 342 (i.e., 3 flexible clips) configured to facilitate attachment of the connector body 324 to the sensor mount structure 306, as further detailed below. The connector body 324 can comprise a pair of pin holes 345 formed through the connector body 324, and a pair of conductive spring pins 326 supported by the connector body 324 and extending through respective pin holes 345, similarly as discussed above regarding conductive spring pins 126 of FIGS. 2A and 2B. Thus, each conductive spring pin 326 can comprise a wiring portion 328a that extends from a first side 329a of the connector body 324 that are each electrically coupleable to lead wires (e.g., 122) of a sensor (e.g., 110) supported by the sensor mount structure 306 (see e.g., FIG. 2A). Accordingly, each conductive spring pin 326 further comprises a contact portion 328b that extends from a second side 329b of the connector body 324 opposite the first side 329a. Note that each spring pin 326 can be similarly constructed as illustrated in FIG. 2A, such that, in response to interfacing the contact portions 328b of the pair of spring pins 326 to contact pads of a circuit board of an electronics assembly, the contact portions 328b translate relative to the wiring portions 328a via compression of respective springs (see e.g., FIG. 2B) to blind-mate couple the spring pin connector 312 to the electronics assembly.

Further regarding the structure and functionality of the spring pin connector 312, the connector body 324 can comprise an alignment feature, such as an alignment clip 325, configured to interface with an alignment portion 327 of the sensor mount structure 306 (FIGS. 3C and 3D) to radially align the spring pin connector 312 relative to the sensor mount structure 306. More particularly, the alignment portion 327 of the sensor mount structure 306 can be a recess formed through a surface 334 of a side 332 of the sensor mount structure 306, and the alignment portion 327 can be sized and shaped to receive and retain the alignment clip 325 of the connector body 324. This ensures that a user does not incorrectly install the spring pin connector 312 to the sensor mount structure 306, which may result in a reversed connection of the conductive spring pins 326 to respective lead wires of a sensor, and therefore reversing the polarity of the sensor as related to the electronics assembly. In this manner, the connector body 324 can only be installed in one rotational position relative to the sensor mount structure 306 by virtue of the alignment clip 325 being received and retained in the alignment portion 327. This alignment interface also ensures that the spring pin connector 312 does not inadvertently rotate about the sensor support structure 306 after installation, which could result in electrical disconnects to a circuit board and/or lead wires to a sensor.

Note that the alignment clip 325 can comprise a flange extending outwardly from a circumferential perimeter of the connector body 324, and that is received into the alignment portion 327 of the sensor mount structure 306. However, other shapes and configurations are contemplated herein to align and restrict rotation of the connector body 324 relative to the sensor mount structure 306.

As mentioned above, the coupling interface 342 of the connector body 324 can comprises a plurality of flexible retention clips 321 (e.g., three in number equally spaced apart) formed about the perimeter of the connector body 324, and a pair of spring support bodies 322 that support respective conductive spring pins 326. Collectively, the alignment clip 325, the spring support bodies 329, and the flexible retention clips 321 can define a central support cavity 331, such that the connector body 324 is formed or shaped as a cup. The spring pin connector 312 can comprise a retention device 333 that is received in the central support cavity 331 of the connector body 324, and can further comprise a fastener 335 that couples together the connector body 324 and the retention device 333. An annular threaded insert 337 (FIG. 3B) can be received into and retained by an aperture 339 (FIG. 3D) formed through a central support portion 341 of the connector body 324. The annular threaded insert 337 can have an annular stop portion 338 that can be received and seated into an annular channel of the central support portion 341 to restrict upward/axial movement of the annular threaded insert 337 relative to the connector body 324. Thus, the fastener 335 can extend through a counter borehole 343 of the retention device 333, and then be threaded to the annular threaded insert 337, thereby coupling together the retention device 333 to the connector body 324.

The retention device 333 can have a Y-shaped body configuration having a plurality of actuation portions 345 (3x) (FIG. 3B), which can each have an inwardly slanted surface operable to slidably interface along an inner surface of a respective flexible retention clip 321 during installation. More specifically, prior to installation of the spring pin connector 312 to the sensor mount structure 306, the spring pin connector 312 can be partially assembled such that the retention device 333 is partially fastened to the connector body 324 (i.e., the fastener 335 can be partially threaded to the insert 337). At this stage, the wiring portions 328a can be coupled to lead wires (e.g., 122) of a sensor (e.g., 110) situated in an aperture 330 of the sensor mount structure 306 (note that the sensor may or may not be attached to the sensor mount structure 306 this stage). Then, the user can insert the connector body 324 into the aperture 330 from the side 332 of the sensor mount structure 306 in a rotational position such that the alignment clip 325 is received into the alignment portion 327 of the sensor mount structure 306. Concurrently, the flexible retention clips 321 automatically bend or flex inwardly toward each other upon interfacing with an inner annular surface of the sensor mount structure 306, and then "snap" into an annular retention channel 347 (FIG. 3D) of the aperture 330 of the sensor mount structure 306. The annular retention channel 347 can be machined laterally into the sensor mount structure 306 to further define the shape of the aperture 330, and can be in fluid communication with the recessed alignment portion 327. Note that the flexible retention clips 321 can flex or bend inwardly because the retention device 333 is not yet fully fastened to the connector body 324, and therefore the retention device 333 is not yet fully received into the central cavity 331. The flexible retention clips 321 are flexible or compliant because of side slots formed on either side of each retention clip 321, which allows for each flexible retention clip 321 to slightly bend inwardly in response to an outer force applied thereto.

Next, the user (or a machine) can begin to fully fasten the fastener 335 (by rotation with a tool bit) to the insert 337, which draws the retention device 333 further down into the central cavity 331 as the fastener 335 continues to be threaded to the insert 337. Concurrently, the actuation portions 345 of the retention device 333 slide along respective flexible retention clips 321 (via the aforementioned slanted surfaces), which causes or applies an outward radial force to the flexible retention clips 321 (because of the slanted or curved profile of each actuation portions 345), which causes outer flanges 349 of the flexible retention clips 321 to be seated or received into the annular retention channel 347 of the sensor mount structure 306. Thus, in these operations, the spring pin connector 312 has been coupled to or attached to the sensor mount structure 306. Once fully installed, as shown in FIG. 3D, the contact ends 328b of the conductive spring pins 326 extend outwardly from the surface 334 of the sensor support structure 306 for blind-mate interfacing to a circuit board of an electronics assembly.

The above installation process of the spring pin connector 312 can be repeated for dozens or hundreds of other similar connectors like the spring connector 312 and sensors to form a sensor array module (e.g., FIG. 1A, 5A). In this assembled configuration, the sensor support structure 306 can then be mounted or installed to a chassis (e.g., 108) of an assembly or vehicle body, such that the contact portions (like 328b) of all of the spring pin connectors (like 312) can be blind-mate interfaced to respective contact pads of a circuit board of an electronics assembly during attachment of the sensor mount structure 306 to the chassis. As discussed above regarding FIGS. 2A and 2B, this provides a plurality of connector float systems (one connector float system corresponding to each connector) to account for positional toleration variations between the sensor array module and the electronics assembly. This also provides a sensor float system, similarly as discussed above, because the sensor is isolated from the spring pin connector 312, as also discussed above.

FIGS. 4A-4G illustrate a spring pin connector 412 for electrically coupling a sensor (e.g., 110) to a circuit board (e.g., 114) of an electronics assembly (e.g., 116), in accordance with an example of the present disclosure. Similarly as exemplified above regarding FIGS. 2A and 2B, the spring pin connector 412 can be one of a plurality of spring pin connectors (like spring connector 412) configured to be attached to a sensor mount structure 406 (FIGS. 4B-4G) to form a sensor array module (e.g., FIG. 1A, 5A) to be blind-mate interfaced to the circuit board for electrically coupling sensors to the electronics assembly.

More specifically, the spring pin connector 412 can comprise a connector body 424 having a coupling interface, such as fastener holes 447, configured to facilitate attachment of the connector body 424 to the sensor mount structure 406, as further detailed below. The connector body 424 can comprise a pair of pin holes 445 formed through the connector body 424, and a pair of conductive spring pins 426 supported by the connector body 424 and extending through respective pin holes 445, similarly as discussed above regarding conductive spring pins 126 of FIGS. 2A and 2B. Thus, each conductive spring pin 426 can comprise a wiring portion 428a that extends from a first side 429a of the connector body 424 that are each electrically coupleable to lead wires (e.g., 122) of a sensor supported by the sensor mount structure 406 (see e.g., FIG. 2A). Accordingly, each conductive spring pin 426 further comprises a contact portion 428b that extends from a second side 429b of the connector body 424 opposite the first side 429a. Note that each spring pin 426 can be similarly constructed as illustrated in FIG. 2B, such that, in response to interfacing the contact portions 428b of the pair of spring pins 426 to contact pads of a circuit board of an electronics assembly, the contact portions 428b translate relative to the wiring portions 428a via compression of respective springs (FIG. 2B) to blind-mate interface and connect the spring pin connector 412 to the electronics assembly. Note that the springs are not shown in the cross sectional view of FIG. 4C for purposes of illustration clarity.

Further regarding the structure and functionality of the spring pin connector 412, the connector body 424 can comprise a disk shaped body or puck, which can be sized and shaped to fit within an aperture 430 of the sensor mount structure 406, as best shown in FIG. 4C. The connector body 424 can comprise a pair of alignment protrusions 422a and 422b that extend outwardly from the second side 429b from the connector body 424, and that each further define respective pin holes 445 formed through the connector body 424. Indeed, each pin hole 445 supports a respective conductive spring pin 426, such that the contact ends 428a extend from the second side 429b and through respective alignment protrusions 422a and 422b for interfacing and blind-mate coupling or connecting to a circuit board (e.g., FIG. 2B).

As best illustrated in FIG. 4C, the sensor mount structure 406 can comprise the aperture 430 that receives a portion of a sensor (see e.g., FIG. 2B) and that receives at least a portion of the connector body 424. More specifically, the connector body 424 can be secured to the sensor mount structure 406 by fasteners 435a and 435b that extends through respective fastener holes 447 of the connector body 424 and that are threaded to a respective fastener insert 437 (similarly formed as insert 337 of FIG. 3B) that is supported in a respective fastener hole 447 of the connector body 424. The fastener holes 447 are each sized and shaped to receive the fastener respective insert 437 from the first side 429a of the connector body 424, and configured to restrict the fastener insert 437 from passing through to the second side 429a (similarly as discussed above regarding FIGS. 3A-3D). In this manner, the fastener inserts 437 are used to secure the connector body 424 to the sensor mount structure 406 via respective fasteners 435a and 435b.

The pair of alignment protrusions 422a and 422b can be sized and shaped to be received through respective pin openings 443a and 443b formed through a connector mounting portion 441 (FIGS. 4B and 4O). Notably, the pin openings 443a and 443b of the connector mount portion 441 are shaped and sized to correspond to the shape and size of the alignment protrusions 422a and 422b for purposes of radially aligning the connector body 424 relative to the sensor mount structure 406. More particularly, the second pin opening 443b is formed as a circular shaped opening that receives the circular or cone shape of the second alignment protrusion 422a, and the first pin opening 443a is formed have a different, or irregular, shaped opening that corresponds to the shape of the first alignment protrusion 422a. As shown in FIG. 4B, the first pin opening 422a can have an elongated or flat oval shaped profile, where side portions of the first pin opening 422a are linear or planar, and end portions are curved, thereby defining the flat oval shaped profile that corresponds to the shape of the first alignment protrusion 422a. Accordingly, the second alignment protrusion 422b has a similarly corresponding shape where the second alignment protrusion 422b can be received into the second pin opening 443b. Therefore, collectively the first and second alignment protrusions 422a and 422b, and the pin openings 443a and 433b, define an alignment feature or configuration, because the connector body 424 can only be installed in one rotational orientation relative to the sensor mount structure 406 by virtue of such alignment feature, which reduces or eliminates the likelihood of improper installation of the connector 412. Said another way, the pin openings 443a and 433b can be considered and can function as alignment holes or apertures, because they assist to radially align the spring pin connector 412 relative to the sensor mount structure 406.

FIGS. 4D-4G illustrate a method of installing the spring pin connector 412 and the sensor 410 to the sensor mount structure 406 from a first side of the sensor mount structure 406, in accordance with an example of the present disclosure. In a first operation, the lead wires 422 can be attached to the wiring ends 428a of the spring pins 426 of the spring pin connector 412. Then, an installation rod 450 can be threaded (or otherwise temporarily coupled) to one fastener insert 437 supported by the fastener hole 447 of the connector body 424 (as shown in FIG. 4D). Then, from a first side 432a of the sensor mount structure 406, a free end of the installation rod 450 can be extended through the aperture 430 and then through the respective fastener hole 447 (FIG. 4F) of the sensor mount structure 406, whereby the user grabs the free end of the installation rod 450 and pulls it through the fastener hole 447 until the connector body 424 is seated against an inner surface of the connector mount portion 441 so that the alignment protrusions 422a and 422b (and spring pins 426) extend through respective pin openings 443a and 443b of the sensor mount structure 406. Thus, in this position, at least some of the sensor 410 is situated in the aperture 403 (see e.g., FIG. 2A).

A user (or machine) can then install the first fastener 435a (FIG. 4F) in the manner described above, while holding onto to the free end of the installation rod 450, to partially attach the connector body 424 to the sensor mount structure 406. Then, the user or machine can remove the installation rod 450 from the connector body 424, such as by unthreading it from the insert 437 (hidden from view). Thus, the installation rod 450 is utilized as a temporary placeholder for purposes of installation and alignment of the spring pin connector 412 to the sensor mount structure 406 from the second side 432b of the sensor mount structure 406. Then, the second fastener 435b can be installed to fully attach the spring pin connector 412 to the sensor mount structure 406, as shown in FIG. 4G. These installation operations are beneficial because a user can assemble the sensor 410 and the connector 412 together, and then insert them both from one side of the sensor mount structure 406, through the aperture 430, and then fasten the connector 412 from the other side of the sensor mount structure 406 in the manner prescribed above.

Note that the connector body 424 and the sensor mount structure 406 can each comprise corresponding vent holes 452a and 452b (FIG. 4O) in fluid communication with each other and with the sensor aperture 430 to facilitate airflow between the aperture 430 and area or space of the second side 432b of the sensor mount structure 406. This can prevent a vacuum from existing in the aperture 430, which would likely restrict or limit desired movement of the sensor elements (e.g., 118) and piston body (e.g., 123) (e.g., FIG. 2B) to move as desired for effective sensing functionality.

The above installation process of the spring pin connector 412 can be repeated for dozens or hundreds of other similar spring pin connectors 412 and sensors to form a sensor array module (e.g., FIGS. 1A, 5A). In this assembled configuration, the sensor support structure 406 can then be mounted or installed to a chassis (e.g., 108) of an assembly or vehicle, such that the contact portions (like 428b) of all of the spring pin connectors (like 412) can be blind-mate interfaced to respective contact pads of a circuit board of an electronics assembly during attachment of the sensor mount structure 406 to the chassis. As discussed above regarding FIGS. 2A and 2B, this provides a plurality of connector float systems (one system for each connector) to account for positional toleration variations between the sensor array module and the electronics assembly. This also provides a sensor float system, similarly as discussed above, because the sensor is isolated from the spring pin connector 412, as also discussed above.

FIG. 5A illustrates a sensor array module 504 comprising a plurality of spring pin connectors 512 and corresponding sensors 510 mounted to a sensor mount structure 506 of the sensor array module 504 for blind-mate coupling the spring pin connectors 512 to a circuit board (e.g., 114) of an electronics assembly (e.g., 116), in accordance with an example of the present disclosure.

FIGS. 5B-5E show various aspects of one connector 512 that can be coupled or attached to the sensor mount structure 506 (FIG. 5D, 5E) of the sensor array module 504, as detailed below. More specifically, the spring pin connector 512 can comprise a connector body 524 having a coupling interface, such as a fastener hole 543, configured to facilitate attachment of the connector body 524 to the sensor mount structure 506, as further detailed below. The connector body 524 can comprise a pair of pin holes 545 formed through the connector body 524, and a pair of conductive spring pins 526 supported by the connector body 524 and extending through respective pin holes 545, similarly as discussed above regarding conductive spring pins 126 of FIGS. 2A and 2B. Thus, each conductive spring pin 526 can comprise a wiring portion 528a that extends from a first side 529a of the connector body 52, each of which can be electrically coupleable to respective lead wires (e.g., 122) of a sensor (e.g., 110) supported by the sensor mount structure 506 (see e.g., FIG. 2A).

Accordingly, each conductive spring pin 526 further comprises a contact portion 528b that extends from a second side 529b of the connector body 524 opposite the first side 529a. Note that each spring pin 526 can be similarly constructed as illustrated in FIG. 2B, such that, in response to interfacing the contact portions 528b of the pair of spring pins 526 to contact pads of a circuit board of an electronics assembly, the contact portions 528b translate relative to the wiring portions 528a via compression of respective springs (FIG. 2B) to blind-mate couple the spring pin connector 512 to the electronics assembly. Note that FIG. 5D omits the spring inside each conductive spring pin 526 for purposes of illustration clarity, but it should be appreciated that the spring pins are the same or similar as those shown in FIG. 2A and described above.

Further regarding the structure and functionality of the spring pin connector 512, the connector body 524 can comprise a disk shaped body or puck (or any other shape or configuration), which can be sized and shaped to fit within a connector recess 519 of the sensor support structure 506 from the second side 532b of the sensor mount structure 506, as best shown in FIG. 5D, The connector body 524 can comprise a first side 539a and an opposing second side 539b, which can each have a respective planar or flat surface 521a and 521b. The connector body 524 can further comprise a pair of protrusions 522a and 522b that extend outwardly from the first side 539a, and that each further define respective pin holes 545 formed through the connector body 524. Indeed, each pin hole 545 supports a respective conductive spring pin 526, such that wiring ends 528a extend from the first side 529a for coupling to lead wires of a sensor (e.g., FIG. 2A), and such that contact ends 528b extend from the second side 529b for blind-mate interfacing or coupling to a circuit board (e.g., FIG. 2B).

As best illustrated in FIG. 5D, the sensor mount structure 506 can comprise the aperture 530 that receives a portion of a sensor (e.g., FIG. 2A) and a portion of the wiring ends 528b of the spring pins 526. That is, the connector recess 519 further defines the aperture 530. More specifically, the connector body 524 can be secured to the sensor mount structure 506 by the fastener 535 (FIG. 5E) that extends through the fastener hole 543 of the connector body 524 and that is threaded to a fastener hole 551 formed through a connector mounting portion 541 that defines by the connector recess 519 of the sensor mount structure 506. Thus, the planar surface 521a of the first 539a of the connector body 524 is interfaced to an outer planer surface 553 of the connector mounting portion 541 of the sensor mount structure 506. In this way, the surface 521b is flush with or substantially planar with the second surface 545 of the sensor mount structure 506.

The pair of protrusions 522a and 522b of the connector body 524 can be received through respective pin openings 534 formed through the connector mounting portion 541. Notably, the pin openings 534 are shaped and sized corresponding to the shape and size of the alignment protrusions 522a and 522b for purposes of radially aligning the connector body 524 relative to the sensor mount structure 506, along with the position of the fastener 535, thereby providing an alignment feature or configuration. That is, the protrusions 522a and 522b and the fastener 535 cooperate to provide a 3-point interface for alignment purposes, so that the connector body 524 can only be installed in one rotational orientation relative to the sensor mount structure 506, which eliminates the chance of improper installation of the connector 512.

Note that the connector body 524 and the sensor mount structure 506 can each comprise corresponding vent holes 552a and 552b in fluid communication with each other and with the sensor aperture 530, and also with the space or area or volume about the second side 532b of the sensor mount structure 506, for the same purposes discussed above regarding FIG. 40.

The above installation process of the spring pin connector 512 can be repeated for dozens or hundreds of other similar connectors 512 and sensors to form the sensor array module 504. In this assembled configuration, the sensor support structure 506 can then be mounted or installed to a chassis (e.g., 108) of an assembly or vehicle, such that the contact portions (like 528b) of all of the spring pin connectors (like 512) can be blind-mate interfaced to respective contact pads of a circuit board of an electronics assembly during attachment of the sensor mount structure 506 to the chassis. As discussed above regarding FIGS. 2A and 2B, this provides a plurality of connector float systems (one system for each connector) to account for positional toleration variations between the sensor array module and the electronics assembly. This also provides a sensor float system, similarly as discussed above, because the sensor is isolated from the spring pin connector 512.

Figure 6A:
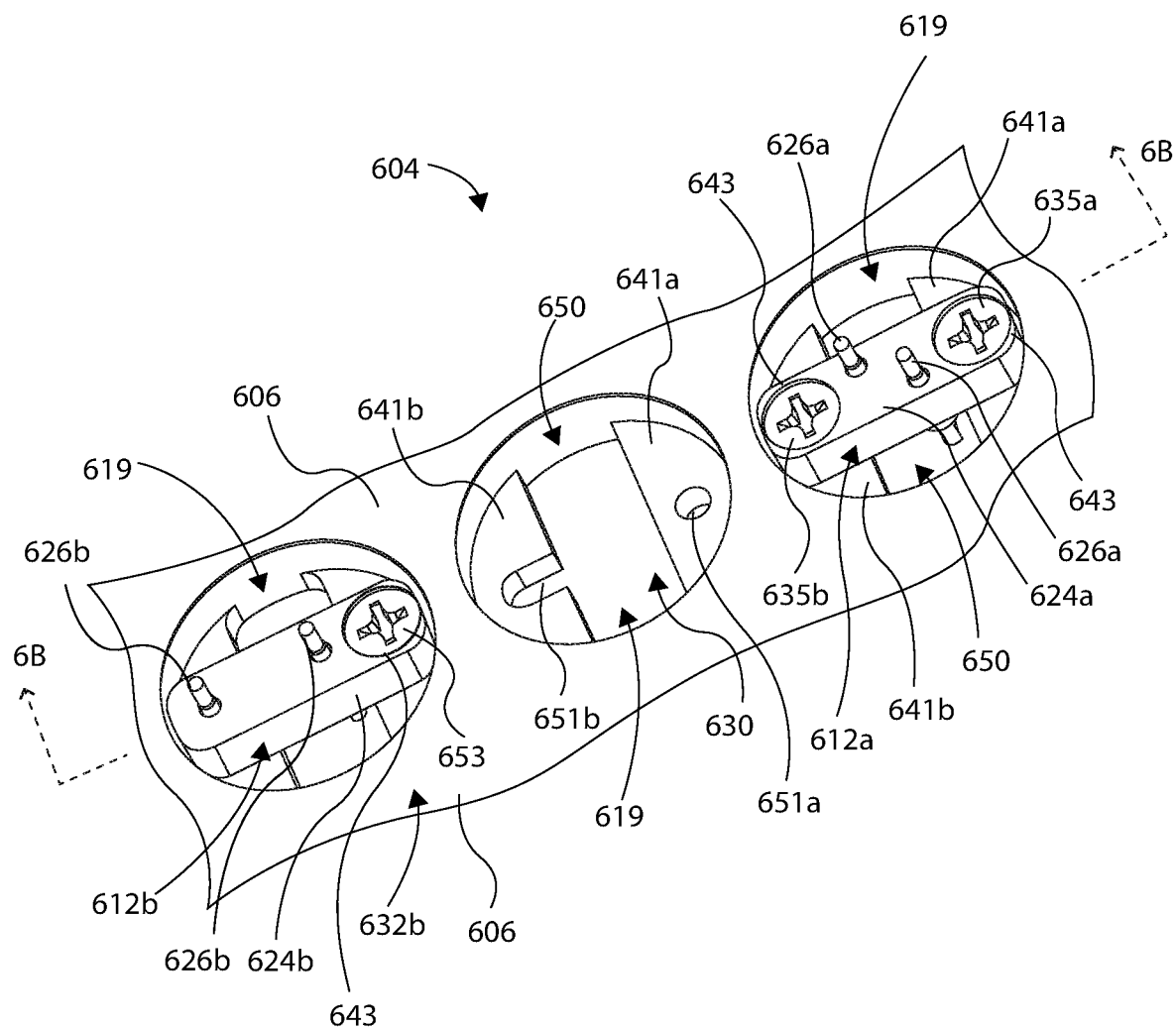
FIG. 6A illustrates a section of a sensor array module, showing a sensor mount structure supporting two different spring pin connectors, in accordance with an example of the present disclosure.
Figure 6B:
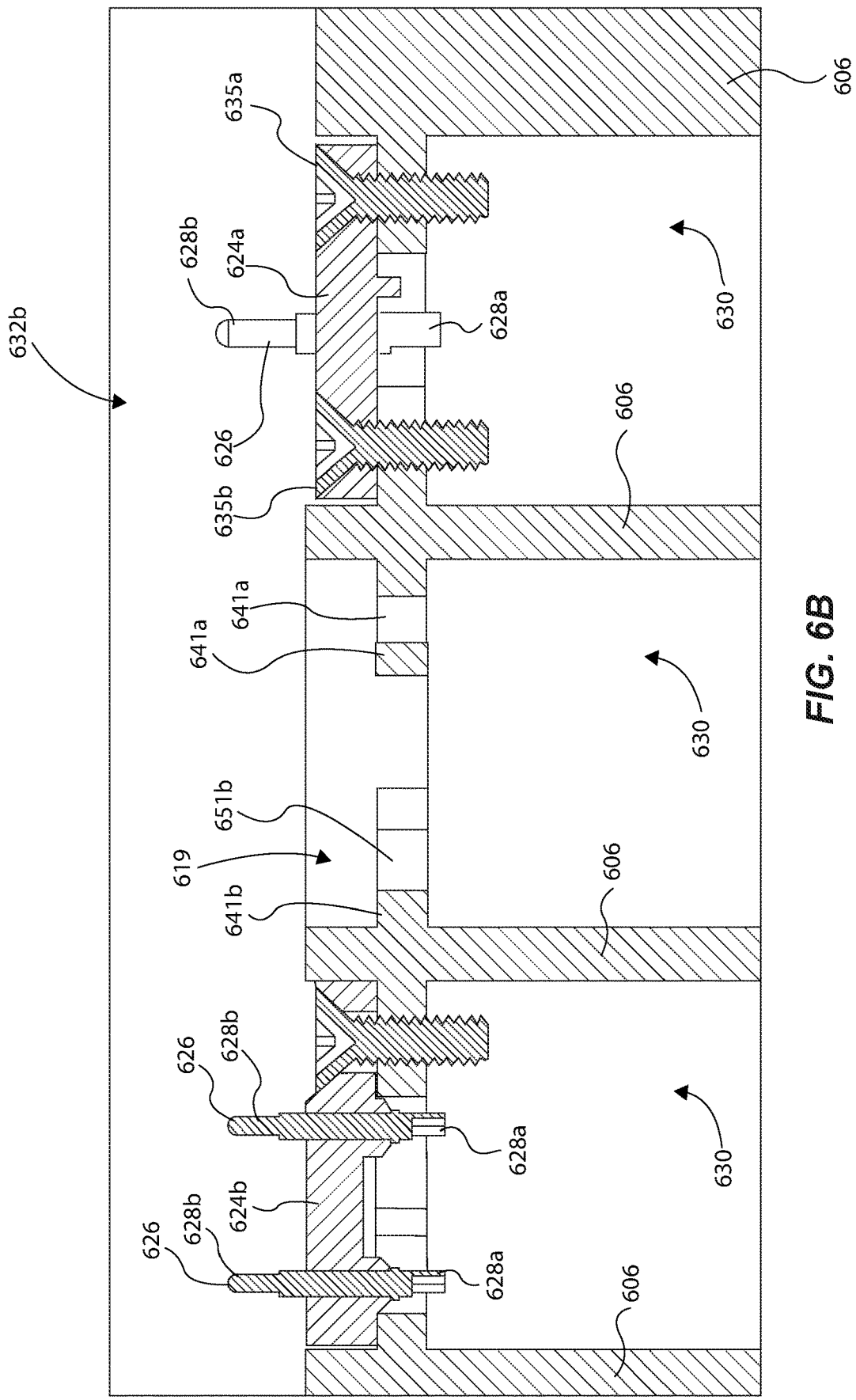
FIG. 6B is a cross sectional view of the section of the sensor array module of FIG. 6A, taken along lines 6B-6B.

FIGS. 6A and 6B illustrates a section of a sensor array module 604 comprising spring pin connectors 612a and 612b, and associated sensors (not shown), mounted to a sensor mount structure 606 of the sensor array module 604 for blind-mate coupling the spring pin connectors 612a and 612b to a circuit board (e.g., 114) of an electronics assembly (e.g., 116), in accordance with an example of the present disclosure. Note that FIG. 6A illustrates two different types of spring pin connector 612a and 612b that could be mounted to the sensor mount structure 606, but it will be appreciated that, in practice, most likely the same type of spring pin connector (either 612a or 612b) would be used as a plurality of spring pin connectors to form a particular sensor array module.

Accordingly, the sensor mount structure 606 can comprise a connector recess 619 (of a plurality of such connector recesses 619) having first and second connector support portions 641a and 641b that span a gap 650 that is in fluid communication with an aperture 630 of the sensor mount structure 606. The first spring pin connector 612a can comprise a connector body 624a having a pair of coupling interfaces, such as fastener holes 643, formed through opposing ends of the connector body 624a. A pair of fasteners 635a and 635b can be used to fasten the connector body 624a to the sensor mount structure 606, in a manner such that the first fastener 635a is threaded to a fastener opening 651a of the first connector support portion 641a, and such that the second fastener 635b is threaded to a fastener slot 651b of the second connector support portion 641b, Thus, the connector body 624a can be a flat disk or plate shaped as an elongated flat oval body (or any other shape or configuration) that is situated in the recess 619 and flush against the first and second connector support portions 641a and 641b.

The spring pins 626a can be supported by the connector body 624a adjacent each other and between the fasteners 643, such that contact portions 628b extend outwardly from the second side 632b of the sensor mount structure 606. Thus, wiring portions of the spring pins 626 are situated at least partially in the aperture 630 for coupling to lead wires of a sensor supported by the sensor mount structure 606.

The second spring pin connector 612b can comprise a connector body 624b that has a similar shape as the other connector body 624a, The connector body 624b can comprise a coupling interface, such as a fastener hole 643, configured to facilitate attachment of the connector body 624b to the sensor mount structure 606, as further detailed below. A fastener 653 can be used to fasten the connector body 624b to the sensor mount structure 606, in a manner such that the fastener 653 is threaded to the fastener opening 651a of the first connector support portion 641a. The spring pins 626b can be supported by the connector body 624b adjacent each other, such that contact portions 628b extend outwardly from the second side 632b of the sensor mount structure 606. Thus, wiring portions of the spring pins 626b are situated at least partially in the aperture 630 for coupling to lead wires of a sensor supported by the sensor mount structure 606. Note that the left conductive spring pin 626b extends through the threaded slot 651a of the second connector support portion 641b, as shown in FIG. 6B.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:
1. A sensor assembly comprising:
an electronics assembly having a circuit board;

a sensor mount structure comprising a first side and a second side, and an aperture formed from the first side towards the second side;

a sensor supported by the sensor mount structure, such that the sensor is situated, at least partially, in the aperture of the sensor mount structure; and a spring pin connector coupled to the sensor mount structure, the spring pin connector having a connector body and a pair of conductive spring pins supported by and extending through the connector body, the pair of conductive spring pins electrically coupled to the sensor, and blind-mate interfaced to the circuit board of the electronics assembly, thereby electrically coupling the sensor to the electronics assembly.

2. The sensor assembly of claim 1, wherein the connector body is at least partially situated within the aperture, and wherein contact ends of the pair of conductive spring pins extend from the second side of the sensor mount structure.

3. The sensor assembly of claim 1, wherein the connector body, the aperture, and the sensor each comprise a central longitudinal axis substantially collinear with each other.

4. The sensor assembly of claim 1, further comprising a pair of lead wires electrically coupled to the sensor and to respective conductive spring pins, wherein the pair of lead wires are entirely contained within the aperture of the sensor mount structure.

5. The sensor assembly of claim 1, wherein the sensor comprises a transponder component situated outside of the aperture about the first side of the sensor mount structure, and wherein the sensor comprises at least one sensing element situated in the aperture.

6. The sensor assembly of claim 1, further comprising a sensor float system comprising a pair of lead wires coupled to a sensing element of the sensor and to respective conductive spring pins of the spring pin connector to facilitate axial float of the sensor element in two degrees of freedom relative to the spring pin connector and the sensor mount structure.

7. The sensor assembly of claim 1, wherein each conductive spring pin comprises a wiring portion, a contact portion, and a spring operatively coupled between the wiring portion and the contact portion to facilitate axial movement of the contact portion relative to the wiring portion via deflection of the spring, whereby the wiring portions of the conductive spring pins are situated at least partially in the aperture of the sensor mount structure, and whereby the contact portions extend outwardly from the second side of the sensor mount structure.

8. The sensor assembly of claim 1, wherein the connector body comprises at least one alignment portion interfaced to an alignment portion of the sensor mount structure to radially align the spring pin connector relative to the sensor mount structure.

9. The sensor assembly of claim 1, further comprising a chassis in support of the electronics assembly, wherein the sensor mount structure comprises a plate secured to the chassis.

10. A vehicle comprising the sensor assembly as in claim 1, wherein the vehicle comprises an underwater unmanned vehicle.

11. The sensor assembly of claim 1, further comprising a plurality of sensors and a plurality of spring pin connectors, the sensor mount structure comprising a plurality of apertures, wherein each spring pin connector is coupled to a respective aperture, and wherein each sensor is supported by the sensor mount structure and at least partially situated in a respective aperture, each sensor being electrically coupled to a respective spring pin connector.

12. The sensor assembly of claim 11, further comprising a plurality of connector float systems each associated with a respective spring pin connector to facilitate float in at least one degree of freedom of movement of the respective spring pin connector relative to the circuit board to account for positional tolerance variations between the plurality of spring pin connectors and the circuit board.

13. The sensor assembly of claim 1, further comprising a connector float system associated with the spring pin connector and operable to facilitate float of the spring pin connector in at least one degree of freedom relative to the circuit board to account for positional tolerance variations between the spring pin connector and the circuit board.

14. The sensor assembly of claim 13, wherein each connector float system comprises each respective conductive spring pin having a spring to facilitate axial movement of a contact portion of the conductive spring pin in response to interfacing with the circuit board during blind-mate interfacing, thereby providing axial float in two degrees of freedom relative to the circuit board.

15. A spring pin connector for electrically coupling a sensor to an electronics assembly, comprising:

a connector body having a coupling interface operable to couple the connector body to a sensor mount structure;

a pair of pin holes formed through the connector body;

a pair of conductive spring pins extending through respective pin holes and supported by the connector body, each conductive spring pin comprising:

a wiring portion that extends from a first side of the connector body, the wiring portion being configured to be electrically coupled to a sensor supported by the sensor mount structure;

a contact portion that extends from a second side of the connector body opposite the first side; and a spring operably coupled between the wiring portion and the contact portion, such that the contact portion is axially movable relative to the wiring portion, wherein, in response to interfacing the contact portions of the conductive spring pins to a circuit board of an electronics assembly, the contact portions translate relative to the wiring portions via compression of respective springs to blind-mate couple the spring pin connector to the circuit board to electrically couple the sensor to the electronics assembly.

16. The spring pin connector of claim 15, wherein the connector body comprises at least one alignment portion configured to interface with an alignment portion of the sensor mount structure to radially align the spring pin connector relative to the sensor mount structure.

17. The spring pin connector of claim 15, wherein the coupling interface of the connector body comprises at least one fastener opening configured to receive a fastener for attaching the connector body to the sensor mount structure.

18. The spring pin connector of claim 15, wherein the coupling interface of the connector body comprises a plurality of flexible retention clips formed about the perimeter of the connector body, the connector body comprising a central support cavity defined at least partially by the flexible retention clips, the spring pin connector further comprising a retention device received in the central support cavity of the connector body, and further comprising a fastener that couples together the connector body and the retention device, wherein the spring pin connector is configured, such that rotation of the fastener causes the retention device to translate through the support cavity, such that the retention device applies a force to the flexible retention clips to secure the spring pin connector into the aperture of the sensor mount structure.

19. The spring pin connector of claim 15, wherein the connector body comprises a disk shaped body, and a pair of alignment protrusions extending from the second side of the connector body and further defining a respective pin hole of the connector body, such that the contact portion of each conductive spring pin extends outwardly from a respective alignment protrusion, wherein the pair of alignment protrusions are each configured to be received through a respective alignment hole of the sensor mount structure, such that the contact portions of the conductive spring pins are configured to extend through a respective alignment hole of the sensor mount structure for blind-mate interfacing to the circuit board.

20. The spring pin connector of claim 15, wherein the connector body comprises a disk shaped body, and a pair of alignment protrusions extending from the first side of the connector body and further defining a respective pin hole of the connector body, such that the wiring portion of each conductive spring pin extends from a respective alignment protrusion, wherein the pair of alignment protrusions are configured to be received through a respective alignment hole of the sensor mount structure, such that the wiring portion of the conductive spring pin is extendable through a respective alignment hole of the sensor mount structure.

21. A method for configuring a sensor assembly, the method comprising:
obtaining a sensor mount structure having a plurality of apertures formed from a first side toward a second side of the sensor mount structure; and
attaching a plurality of spring pin connectors to the sensor mount structure, each spring pin connector associated with a respective aperture of the sensor mount structure, and having a pair of conductive spring pins electrically coupled to a sensor situated at least partially in a respective aperture of the sensor mount structure, to form a sensor array module configured to be blind-mate coupled to an electronics assembly.

22. The method of claim 21, wherein attaching the plurality of spring pin connectors to the sensor mount structure comprises attaching a connector body of each spring connector to the sensor mount structure, such that the connector body is situated at least partially in the respective aperture of the sensor mount structure.

23. The method of claim 21, further comprising:
electrically coupling the plurality of spring pin connectors to respective sensors via lead wires;
coupling the plurality of sensors to the sensor mount structure from the first side, such that at least one sensing element of each sensor is situated in a respective aperture of the sensor mount structure, and such that the lead wires are situated in the respective aperture; and
attaching the plurality of spring pin connectors to the sensor mount structure from the second side of the sensor mount structure, such that the conductive spring pins of the spring pin connectors extend outwardly from the second side of the sensor mount structure.

24. The method of claim 21, further comprising blind-mate coupling the conductive spring pins of each spring pin connector to a circuit board of an electronics assembly to electrically couple the plurality of sensors to the electronics assembly.

25. The method of claim 24, further comprises securing the sensor mount structure to a chassis to facilitate the blind-mate coupling between the sensor array module and the electronics assembly.

26. The method of claim 24, wherein, during blind-mate coupling, each conductive spring pin of each spring pin connector is operable to independently deflect relative to other conductive spring pins to account for positional tolerance variations between the spring pin connectors and the circuit board.

* * * * *